United States Patent
Tanimura et al.

(10) Patent No.: US 6,214,298 B1
(45) Date of Patent: *Apr. 10, 2001

(54) OZONE PRODUCING APPARATUS RESPONSIVE TO AN ABNORMAL DRIVING CONDITION

(75) Inventors: Yasuhiro Tanimura; Junji Hirotsuji; Shigeki Nakayama; Hisao Amitani; Hiroshi Yuge; Tateki Ozawa, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,179

(22) Filed: Jul. 8, 1998

(30) Foreign Application Priority Data

Jul. 24, 1997 (JP) .................................................. 9-198436

(51) Int. Cl.[7] ............................... B01J 19/08; B01J 19/12
(52) U.S. Cl. ............................... 422/186.08; 422/186.07; 422/186.11; 422/186.15
(58) Field of Search ........................ 422/186.07, 186.08, 422/186.11, 186.15; 210/760

(56) References Cited

U.S. PATENT DOCUMENTS

| | | |
|---|---|---|
| 4,430,306 | 2/1984 | Namba et al. . |
| 4,453,953 | 6/1984 | Tanaka et al. . |
| 4,552,659 | 11/1985 | Tabata et al. . |
| 5,520,887 | 5/1996 | Shimizu et al. . |
| 5,888,271 | * 3/1999 | Tanimura et al. .................. 95/12 |

FOREIGN PATENT DOCUMENTS

| | | |
|---|---|---|
| 0 262 449 | 4/1988 | (EP) . |
| 0 767 002 | 4/1997 | (EP) . |
| 52-3595 | 1/1977 | (JP) . |
| 55-61984 | 5/1980 | (JP) . |
| 360264310 | * 12/1985 | (JP) . |

OTHER PUBLICATIONS

Patent Abstracts of Japan, vol. 97, No. 10, Oct. 31, 1997, JP 9–142808, Jun. 03, 1997.

E. Coleman, et al., Journal of Vacuum Science & Technology, vol. 9, No. 4, pp. 2408–2409, "A Versatile Low–Pressure Ozone Source", Jul. 01, 1991.

JPO Abstract of JP 360264310 A, Dec. 1985.*

JPO Abstract of JP 357180485 A, Nov. 1982.*

* cited by examiner

*Primary Examiner*—Kathryn Gorgos
*Assistant Examiner*—Wesley A. Nicolas
(74) *Attorney, Agent, or Firm*—Oblon, Spivak, McClelland, Maier & Neustadt, P.C.

(57) ABSTRACT

An ozone producing apparatus comprising an ozone generator for generating ozonized oxygen, an adsorption/desorption tower for adsorbing and storing ozone from the ozonized oxygen generated by the ozone generator, and an ozone desorbing means for desorbing the adsorbed and stored ozone for supply, wherein a reducer storage for storing reducer therein is connected to the adsorption/desorption tower through a switch valve which is opened when the ozone producing apparatus is under an abnormal driving condition. Desorbed ozone can be safely treated even in the case of power failure or an abnormal driving condition in which high pressure or high temperature exists in the adsorption/desorption tower.

15 Claims, 25 Drawing Sheets

OZONE PRODUCING APPARATUS RESPONSIVE TO AN ABNORMAL DRIVING CONDITION

BACKGROUND OF THE INVENTION

The present invention relates to an ozone producing apparatus. More particularly, it relates to an ozone producing apparatus for continuously producing ozone and storing the same in an adsorbed state and supplying the ozone when required by desorbing (separating) the same.

While a large quantity of cooling water is used at power stations and in chemical industries, microorganisms or seaweed in the water cause slime hazards and thereby resulting in blockage of canals or deterioration of heat exchange efficiency. One method which might be taken as a countermeasure to prevent such troubles is to employ ozone water of high density. In order to produce high density ozone water, it is more advantageous to employ a so-called intermittent ozone producing method, wherein a small sized ozone generator of small capacity is used to store the produced ozone by using an adsorbent over a long period and to take this stored ozone out from the adsorbent when required for producing high density ozone water, than producing ozone with an ozone generator of large capacity, in view of initial and running costs.

An ozone producing apparatus employing such an ozone producing method is known to comprise the following components as shown in FIG. 25: an ozone generator 50, an oxygen supply source 51, a circulating blower 52, an adsorption/desorption tower 53, a cooling source 54, a heating source 55, a water flow ejector 56 and switch valves 57a to 57g. The adsorption/desorption tower 53 is of double cylinder type of which inner cylinder is filled with an ozone adsorbent and an outer cylinder with heating medium. Silica gel might be employed as the ozone adsorbent, and ethylene glycol or alcohol group as the heating medium. It should be noted that the circulating blower 52, ozone generator 50 and adsorption/desorption tower 53 constitute, in this order, a circulating system.

Operations of the apparatus will now be explained. There are two operations in total, namely ozone adsorbing operation, and ozone desorbing operation.

The adsorbing operation will first be explained. Oxygen is supplied by the oxygen supply source 51 so that the pressure in the circulating system OL is always constant. In this case, the pressure is normally maintained at 1.5 kg/cm$^2$. When oxygen is made to flow in the circulating system by the circulating blower 52 while the switch valves 57c and 57d are in an opened condition, a part of the oxygen is converted into ozone to generate an ozonized oxygen while passing through the discharge space of the ozone generator 50, and the ozonized oxygen is then transferred to the adsorption/desorption tower 53. The adsorbent in the adsorption/desorption tower 53 selectively adsorbs ozone, and the remaining oxygen is returned to the circulating blower 52 through the switch valve 57c. Oxygen which has been consumed as ozone to be adsorbed is supplemented through the oxygen supply source 51. Since the adsorbent assumes a property that adsorption capacity of ozone varies depending on temperature, the adsorbent is cooled by the cooling source 54 to not more than −30° C. That is, the lower the temperature becomes, an amount of ozone adsorption increases, while the higher the temperature becomes, it decreases. Accordingly, the temperature of adsorbent is raised by the heating source 55 when desorbing ozone.

When the adsorbent in the adsorption/desorption tower 53 has adsorbed ozone to approach the ozone saturation adsorption amount, the desorbing operation of ozone is performed. In the desorbing operation, operations of the ozone generator 50, circulating blower 52 and cooling source 54 are terminated and the switch valves 57a to 57d are closed. Thereafter, the heating source 55 and water flow ejector 56 start their operation and switch valves 57e to 57g are opened. At this time, temperature of the adsorbent is raised by applying heat through the heating source 55 so that ozone which has been adsorbed by the adsorbent can be easily desorbed therefrom. By depressing to suck ozone in the adsorption/desorption tower 53 by means of the water flow ejector 56, ozone is dispersed into water in the water flow ejector 56 to be dissolved and sent to, as ozone water, places where it is used. When the desorbing period is completed in this way, the process returns to the initial adsorbing operation and is continuously repeated.

In the case where power failure occurs during, for example, the driving of a conventional apparatus for performing an adsorbing process, the cooling source 54 is terminated whereupon the temperature of the ozone adsorbent in the adsorption/desorption tower 53 rises to cause a decrease in the amount of adsorbed ozone. Consequently, there is caused a drawback that ozone which has been adsorbed by the adsorbent separates therefrom and ozone filling the adsorption/desorption tower 53 at a high density and a high pressure rapidly starts decomposition whereby stored ozone is consumed wastefully. Also in case of power failure during a desorbing process, ozone filling the adsorption/desorption tower 53 at a high density and a high pressure can not be taken out therefrom.

Further, despite the provision of a safety valve in the adsorption/desorption tower 53, it is impossible to discharge ozone of high density to the periphery of the apparatus, and even in the case where the apparatus is connected to an ozone decomposing device, the ozone decomposing device needs to be of quite a large capacity since a large amount of ozone of high density is discharged at one time. Thus, such a safety device is not a very economical measure to provide for an emergency case.

The present invention has been made in view of the above circumstances, and it is an object of the present invention to provide an ozone producing apparatus which can prevent destruction of the apparatus, explosion or fire and which can safely treat the adsorbed ozone in the case where electrical power fails or where the apparatus is under an abnormal driving condition such that a high pressure and/or high temperature condition exists in the adsorption/desorption tower.

SUMMARY OF THE INVENTION

The ozone producing apparatus according to a first invention comprises an ozone generator for generating ozonized oxygen, an adsorption/desorption tower for adsorbing and storing ozone from the ozonized oxygen generated by the ozone generator, and an ozone desorbing means for desorbing the adsorbed and stored ozone for supply, and is characterized in that a reducer storage for storing reducer therein is connected to the adsorption/desorption tower through a switch valve which is opened when the ozone producing apparatus is under an abnormal driving condition.

The ozone producing apparatus according to a second invention comprises an ozone generator for generating ozonized oxygen, an adsorption/desorption tower for adsorbing and storing ozone from the ozonized oxygen generated by the ozone generator, and an ozone desorbing means for desorbing the adsorbed and stored ozone for supply, and is characterized in that a silica gel filler which is filled with silica gel and an ozone decomposer are sequentially connected to the adsorption/desorption tower through a switch valve which is opened when the ozone producing apparatus is under an abnormal driving condition.

The ozone producing apparatus according to a third invention comprises an ozone generator for generating ozonized oxygen, an adsorption/desorption tower for adsorbing and storing ozone from the ozonized oxygen generated by the ozone generator, and an ozone desorbing means for desorbing the adsorbed and stored ozone for supply, and is characterized in that the adsorption/desorption tower and a water piping disposed in a downstream side of the ozone desorbing means are connected to each other through a switch valve which is opened when the ozone producing apparatus is under an abnormal driving condition.

The ozone producing apparatus according to a fourth invention comprises an ozone generator for generating ozonized oxygen, an adsorption/desorption tower for adsorbing and storing ozone from the ozonized oxygen generated by the ozone generator, and an ozone desorbing means for desorbing the adsorbed and stored ozone for supply, and is characterized in that a gas storage is connected to the adsorption/desorption tower through a switch valve which is opened when the ozone producing apparatus is under an abnormal driving condition.

The ozone producing apparatus according to a fifth invention includes an electricity supply monitor for detecting a power failure condition which determines that the apparatus is under an abnormal driving condition when a power failure is detected.

The ozone producing apparatus according to a sixth invention includes a pressure detecting means for measuring a pressure in the adsorption/desorption tower which determines that the apparatus is under an abnormal driving condition when the pressure in the adsorption/desorption tower has deviated from a predetermined range.

The ozone producing apparatus according to a seventh invention includes a temperature detecting means for measuring a temperature in the adsorption/desorption tower which determines that the apparatus is under an abnormal driving condition when the temperature in the adsorption/desorption tower has deviated from a predetermined range.

The ozone producing apparatus according to an eighth invention is characterized in that the apparatus automatically returns to the original driving condition when it has restored from an abnormal driving condition to a normal condition.

DETAILED DESCRIPTION OF THE INVENTION

The ozone producing apparatus according to the present invention is arranged to perform the following operations upon detection of power failure and/or an abnormal driving condition in which pressure or temperature in the adsorption/desorption tower has deviated from a predetermined range: (1) introducing desorbed ozone of high density to the reducer storage for making ozone react with the reducer; (2) introducing desorbed ozone of high density to the silica gel filler for equalizing the ozone density and for decomposing by means of the ozone decomposer; (3) providing a piping for supplying ozone directly to places where ozone is used and for introducing desorbed ozone of high density; (4) introducing desorbed ozone of high density to the gas storage for equalizing the ozone density and for decomposing by means of the ozone decomposer; and (5) automatically returning to the original driving condition when the apparatus has restored from an abnormal driving condition to a normal condition. With these arrangements, adsorbed and stored ozone is prevented from being rapidly decomposed and adsorbed ozone can be safely treated even in case of power failure or an abnormal driving condition in which high pressure or high temperature exists in the adsorption/desorption tower, and after restoring to the normal condition from the abnormal driving condition, the apparatus returns its original driving condition automatically so that ozone can be safely produced.

Embodiment 1

Figure 1:
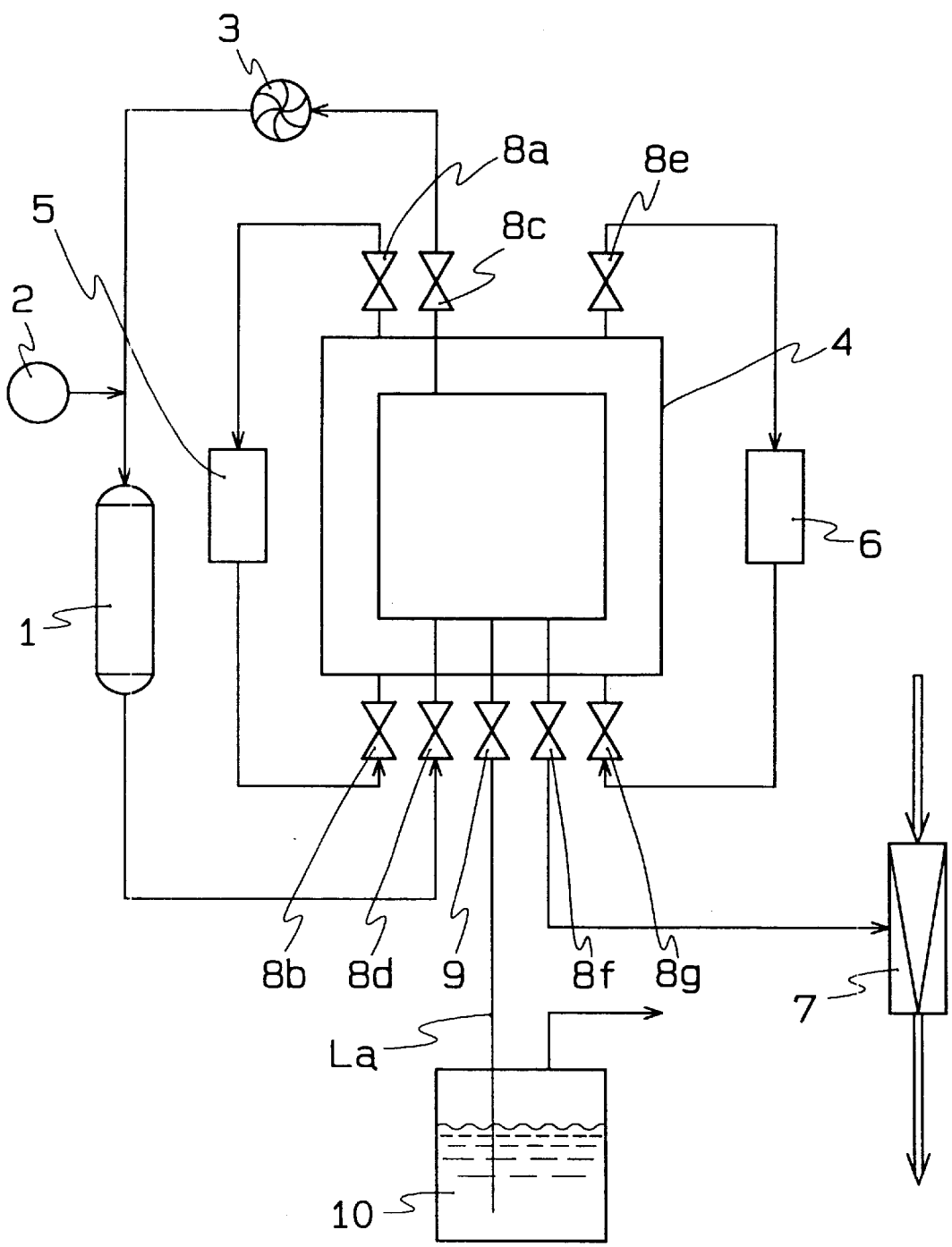
FIG. 1 is a diagram showing an arrangement of an ozone producing apparatus according to Embodiment 1 of the present invention.

FIG. 1 is a diagram showing an arrangement of an ozone producing apparatus according to Embodiment 1 of the present invention. As shown in FIG. 1, the apparatus comprises an ozone generator 1, an oxygen supply source 2, a circulating blower 3, an adsorption/desorption tower 4, a cooling source 5, a heating source 6, a water flow ejector 7 which serves as an ozone desorbing means, switch valve 8a to 8g, 9, and a reducer storage 10. The switch valve 9 and reducer storage 10 are connected to the adsorption/desorption tower 4 by a piping La. In the interior of the reducer storage 10, a reducer such as sodium thiosulfate solution or potassium iodide is stored. It should be noted that the switch valve 9 is made to be driven by an emergency power supply.

Operations of the apparatus of FIG. 1 will now be explained. In this apparatus, when power failure occurs during driving or an abnormal driving condition occurs in which high pressure or high temperature exists in the adsorption/desorption tower 4, the switch valve 9 is opened to introduce ozone which has been adsorbed and stored in the adsorption/desorption tower 4 to the reducer storage 10 via the piping La which then undergoes a desorbing treatment with the reducer.

Since ozone which is stored in the adsorption/desorption tower 4 is introduced to the reducer storage for decomposing in case of abnormal driving condition, adsorbed and stored ozone can be prevented from being rapidly decomposed, and adsorbed ozone can be safely treated. Further, by using a reducer, it is enabled not only to safely treat even ozone of high density but also to reduce capacity of the apparatus for realizing downsizing thereof.

Embodiment 2

Figure 2:
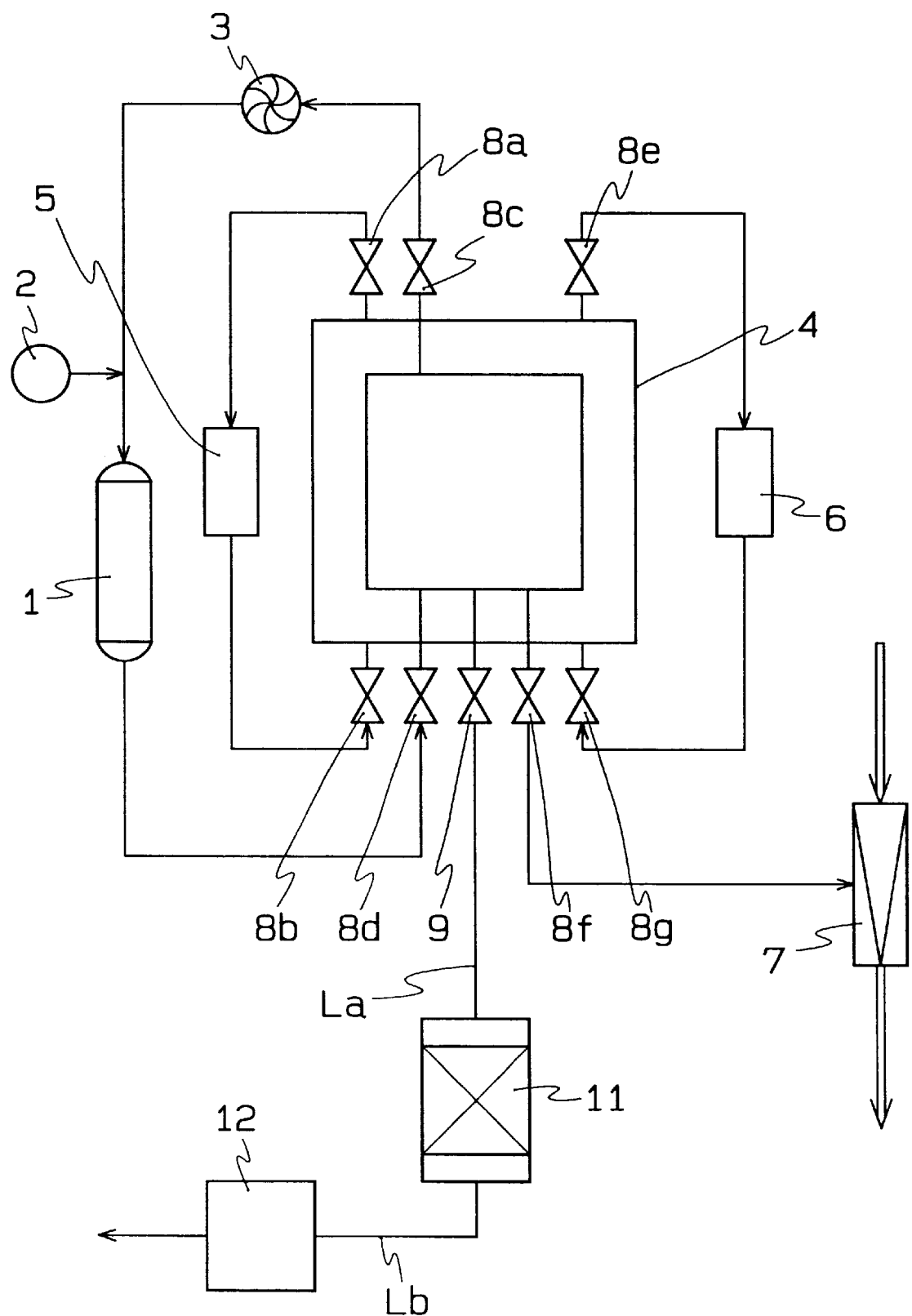
FIG. 2 is a diagram showing an arrangement of an ozone producing apparatus according to Embodiment 2 of the present invention.

FIG. 2 is a diagram showing an arrangement of an ozone producing apparatus according to Embodiment 2 of the present invention. In FIG. 2, numeral 11 denotes a filler, 12 an ozone decomposer, and the interior of the filler 11 is filled with porous material impregnated, for instance, with silica gel, activated alumina or fluorocarbon. The filler 11 and switch valve 9 are connected to the adsorption/desorption tower 4 via a first piping La. The filler 11 and the ozone decomposer 12 are connected to each other via a second piping Lb. While the ozone decomposer 12 is filled with an ozone decomposing catalyst which might be of activated carbon or of manganese type, but the present invention is not limited thereto, and the ozone decomposer might also be an ozone decomposer employing a thermal cracking method. The remaining arrangements are equal to those of FIG. 1.

Operations of the apparatus of FIG. 2 will now be explained. In this apparatus, when power failure occurs during driving or an abnormal driving condition occurs in which high pressure or high temperature exists in the adsorption/desorption tower 4, the switch valve 9 is opened to introduce ozone-containing gas which is adsorbed and stored in the adsorption/desorption tower 4 via the piping La to the filler 11. Immediately after opening the switch valve 9, ozone-containing gas of very high density or, under some circumstances, ozone-containing gas of high pressure and high density is exhausted via the piping La. At this time, the density and pressure gradually decrease. When the ozone-containing gas of decreased density and pressure is supplied to the filler 11, a part of ozone of high density is adsorbed while passing through the silica gel filler layer since silica gel has a property to selectively adsorb ozone. In this way, ozone-containing gas of decreased ozone density is sent to the ozone decomposer 12 via the piping Lb and ozone is decomposed thereafter.

Since ozone which is stored in the adsorption/desorption tower 4 is introduced through the filler 11 to the ozone decomposer 12 after equalizing the ozone density for decomposition in case of abnormal driving condition, the ozone decomposer 12 might be of small size since it is not necessary to manufacture the ozone decomposer to be suitable for ozone of high pressure and high density at the initial stage of exhaustion. Further, since ozone which is stored in the adsorption/desorption tower 4 is exhausted and decomposed by opening the switch valve 9 in case of an abnormal driving condition, adsorbed and stored ozone is prevented from being rapidly decomposed and adsorbed ozone can be safely treated.

Embodiment 3

Figure 3:
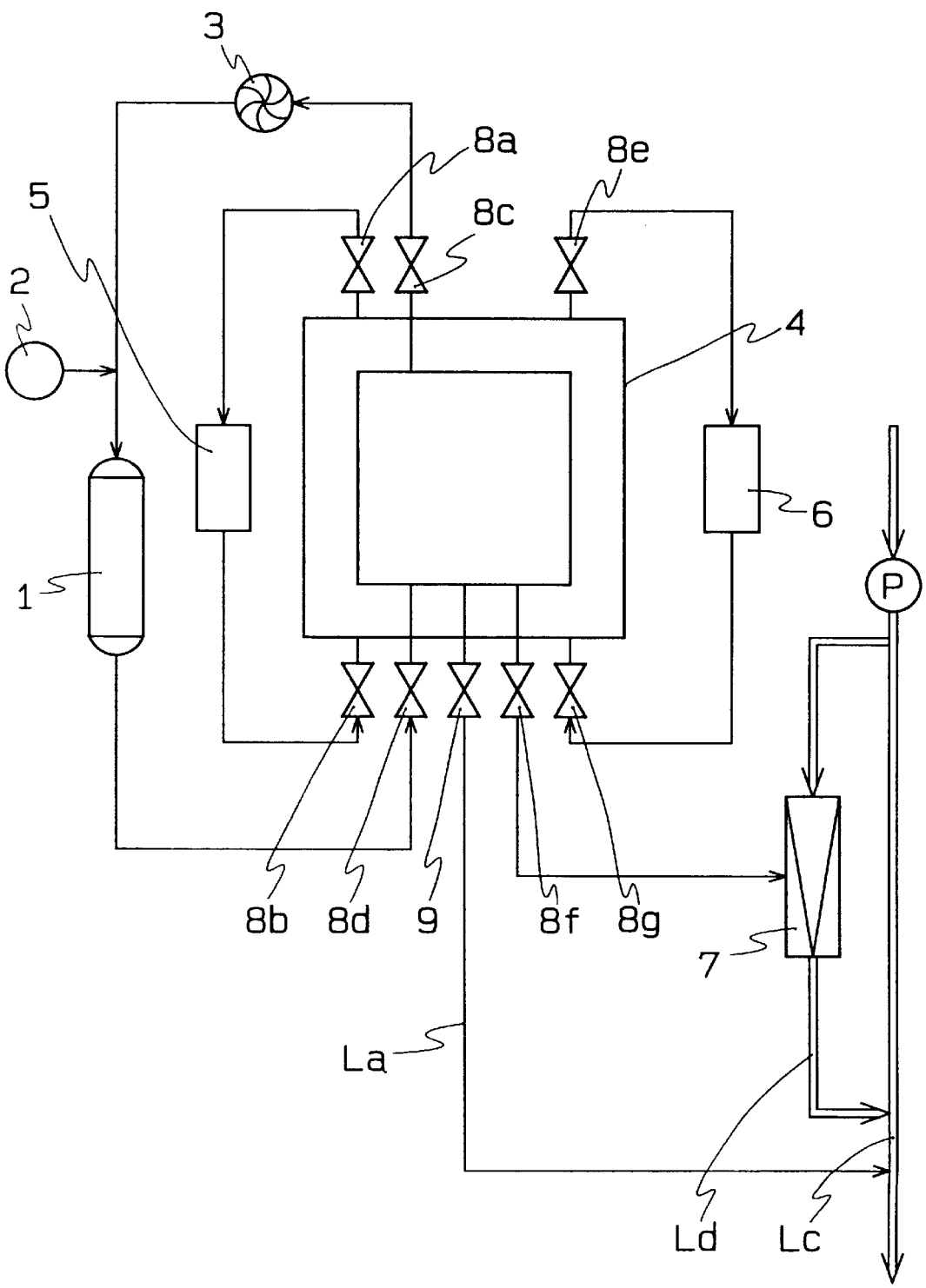
FIG. 3 is a diagram showing an arrangement of an ozone producing apparatus according to Embodiment 3 of the present invention.

FIG. 3 is a diagram showing an arrangement of an ozone producing apparatus according to Embodiment 3 of the present invention. In FIG. 3, the piping La is connected to the switch valve 9 and to a water piping Lc on the downstream side of the water flow ejector 7. It should be noted that the water flow ejector 7 is connected to a branching piping Ld of the water piping Lc, and ozone is designed to be injected into water sent from a pump P operated by an emergency power supply. The remaining arrangements are identical with those of FIG. 1.

Operations of the apparatus of FIG. 3 will now be explained. In this apparatus, when power failure occurs during driving or an abnormal driving condition occurs in which high pressure or high temperature exists in the adsorption/desorption tower 4, the switch valve 9 is opened and ozone-containing gas which is adsorbed and stored in the adsorption/desorption tower 4 is discharged to the piping Lc of the water flow ejector 7 via piping La. Ozone which is injected into the water piping Lc is consumed by reacting with substances in the water such as organic substances.

Since ozone stored in the adsorption/desorption tower 4 is introduced and injected into the water piping Lc of the water flow ejector 7 in order to make ozone react with reactive substances in the water such as organic substances for treatment in case of an abnormal driving condition, ozone which is adsorbed and stored is prevented from being rapidly decomposed and adsorbed ozone can be safely treated even under an abnormal driving condition. Further, since it is sufficient to provide a switch valve and piping in this method, the apparatus can be simplified.

Embodiment 4

Figure 4:
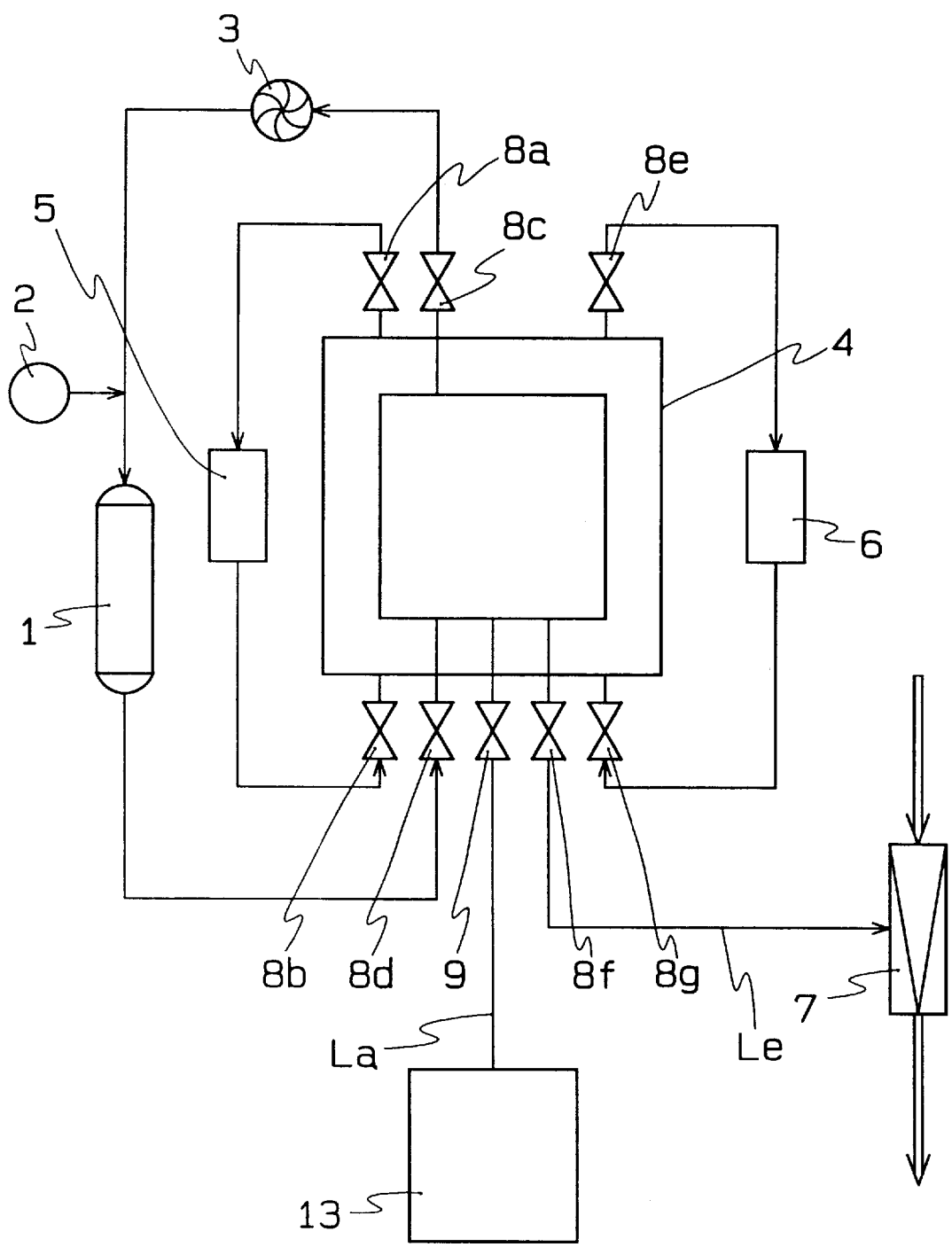
FIG. 4 is a diagram showing an arrangement of an ozone producing apparatus according to Embodiment 4 of the present invention.

FIG. 4 is a diagram showing an arrangement of an ozone producing apparatus according to Embodiment 4 of the present invention. In FIG. 4, numeral 13 denotes a gas storage which is connected to the switch valve 9 via the piping La. The remaining arrangements are identical with those of FIG. 1.

Operations of the apparatus of FIG. 4 will now be explained. In this apparatus, when power failure occurs during driving or an abnormal driving condition occurs in which high pressure or high temperature exists in the adsorption/desorption tower 4, the switch valve 9 is opened and ozone-containing gas which is adsorbed and stored in the adsorption/desorption tower 4 is stored in the gas storage 13 via the piping La. When ozone in the adsorption/desorption tower 4 is decompressed and sucked by the water flow ejector 7 after the apparatus has returned to a normal condition, the ozone-containing gas stored in the gas storage 13 is again supplied to the water flow ejector 7 through the piping La, adsorption/desorption tower 4 and piping Ld, and is dispersed and dissolved into water in the water flow ejector 7.

Since ozone which is stored in the adsorption/desorption tower 4 is temporarily stored in the gas storage 13 in case of an abnormal driving condition, ozone which is adsorbed and stored is prevented from being rapidly decomposed and adsorbed ozone can be made good use of even under an abnormal driving condition. Further, since it is sufficient to provide a switch valve, piping and a gas storage in this embodiment, the apparatus can be simplified.

Embodiment 5

Figure 5:
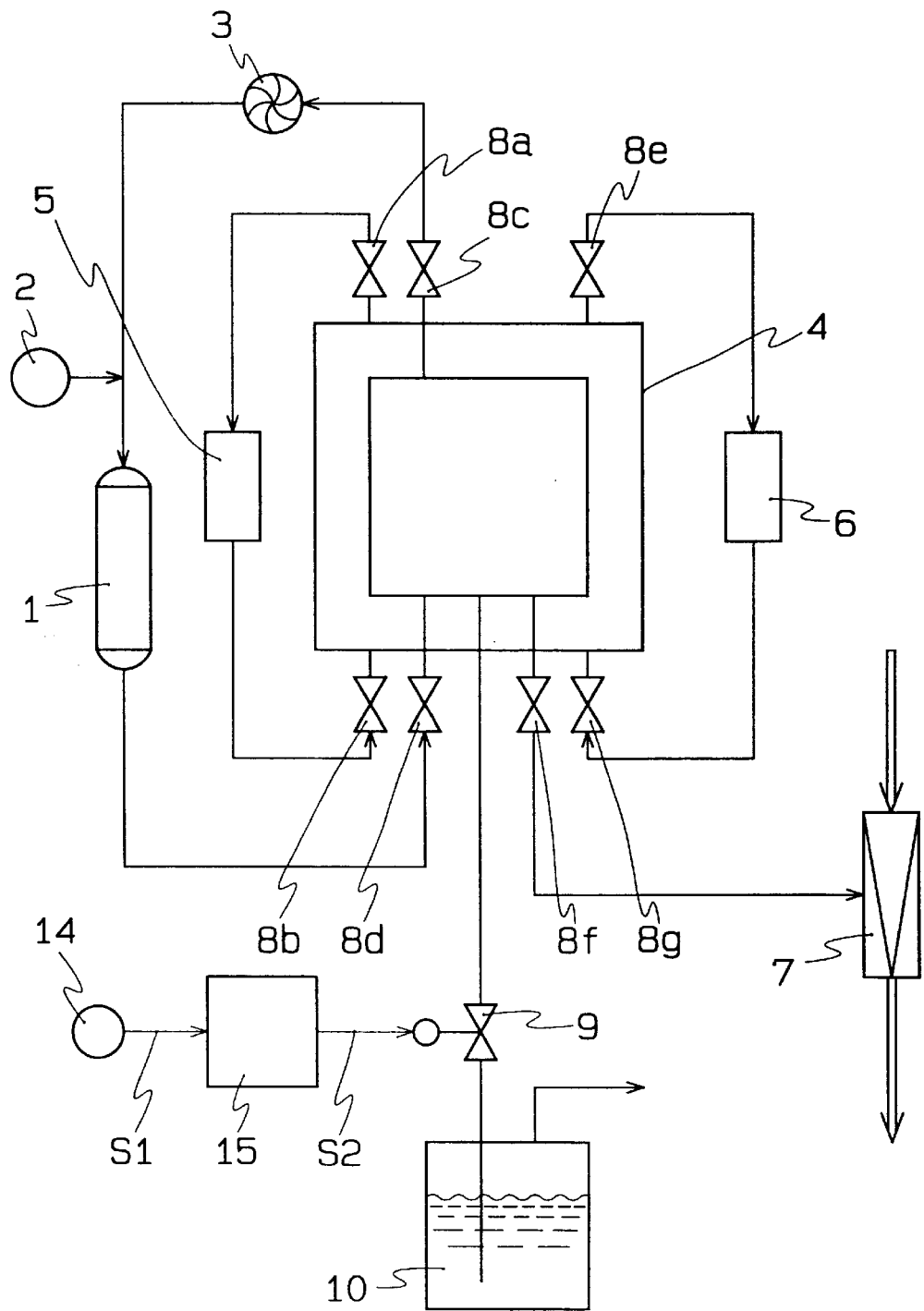
FIG. 5 is a diagram showing an arrangement of an ozone producing apparatus according to Embodiment 5 of the present invention.

FIG. 5 is a diagram showing an arrangement of an ozone producing apparatus according to Embodiment 5 of the present invention. In FIG. 5, the apparatus comprises a monitor 14 for monitoring electricity supply conditions to the apparatus, which is an electricity supply monitoring means, a control circuit 15, and signal lines S1, S2. The remaining arrangements are identical with those of FIG. 1. An output signal from the electricity supply condition monitor 14 is connected to an input of the control circuit 15 via the signal line S1, and an output of the control circuit 15 is connected to the switch valve 9 via the signal line S2 as an opening/closing signal for the switch valve 9.

Operations of the apparatus of FIG. 5 will now be explained. In this apparatus, the electricity supply condition to the apparatus during driving is continuously observed by the electricity supply condition monitor 14, and when power failure is detected, a corresponding signal is transmitted to the control circuit 15 via the signal line S1. The control circuit 15 sends immediately, or depending the driving condition, an opening/closing or opening degree adjusting signal for the switch valve 9 to the switch valve 9 via the signal line S2, and based on this signal the opened/closed condition or the opening degree is controlled at the switch valve 9. It should be noted that sending a signal depending on the driving condition indicates the followings: this apparatus is an apparatus for producing ozone by repeating an ozone adsorbing and storing process and a desorbing process, and it is possible to change timings for sending an opening/closing or opening degree control signal for the switch valve 9 between the ozone adsorbing and storing process, and the desorbing process. In other words, when the temperature of the adsorbent in the adsorption/desorption tower 4 is being raised by applying heat by the heating source 6 during the desorbing process, the switch valve 9 is preferably operated immediately, since ozone of high density remains in the adsorption/desorption tower 4 at a high pressure. Further, even though the same desorbing process is performed, if desorbed ozone is supplied to the water flow ejector 7 from the adsorption/desorption tower 4, the adsorption/desorption tower 4 is at a negative pressure, so that the switch valve 8f is preferably closed immediately and the switch valve 9 might be operated after a specified time has lapsed, and the ozone pressure and density in the adsorption/desorption tower 4 has raised. On the other hand, when the apparatus is performing an adsorbing and storing process and electrical power fails, the switch valve 9 might be operated after a specified time has lapsed and when temperature in the adsorption/desorption tower 4 starts rising, since the adsorption/desorption tower 4 is maintained at a low temperature by the cooling source 5 and the temperature of the adsorbent does not rise immediately after power failure.

Monitoring of electricity supply condition to the apparatus might be performed, for instance, by utilizing a contact signal of a relay provided in the electricity supply line, and monitoring of a lapsed time after power failure might be performed by providing a timer in the control circuit 15. Further, supply of power at the time of power failure might be performed by using, for instance, a storage battery. Each of these measures can be performed easily and at low cost.

When electrical power has failed and the apparatus is under an abnormal driving condition, it is automatically detected that, for instance, electrical power has failed and the opening/closing condition or the opening degree of the switch valve 9 is controlled based on a corresponding signal thereof to draw ozone stored in the adsorption/desorption tower 4 for treatment. With this arrangement, adsorbed and stored ozone can be prevented from being rapidly decomposed also under an abnormal driving condition, and the apparatus can be safely driven.

Embodiment 6

Figure 6:
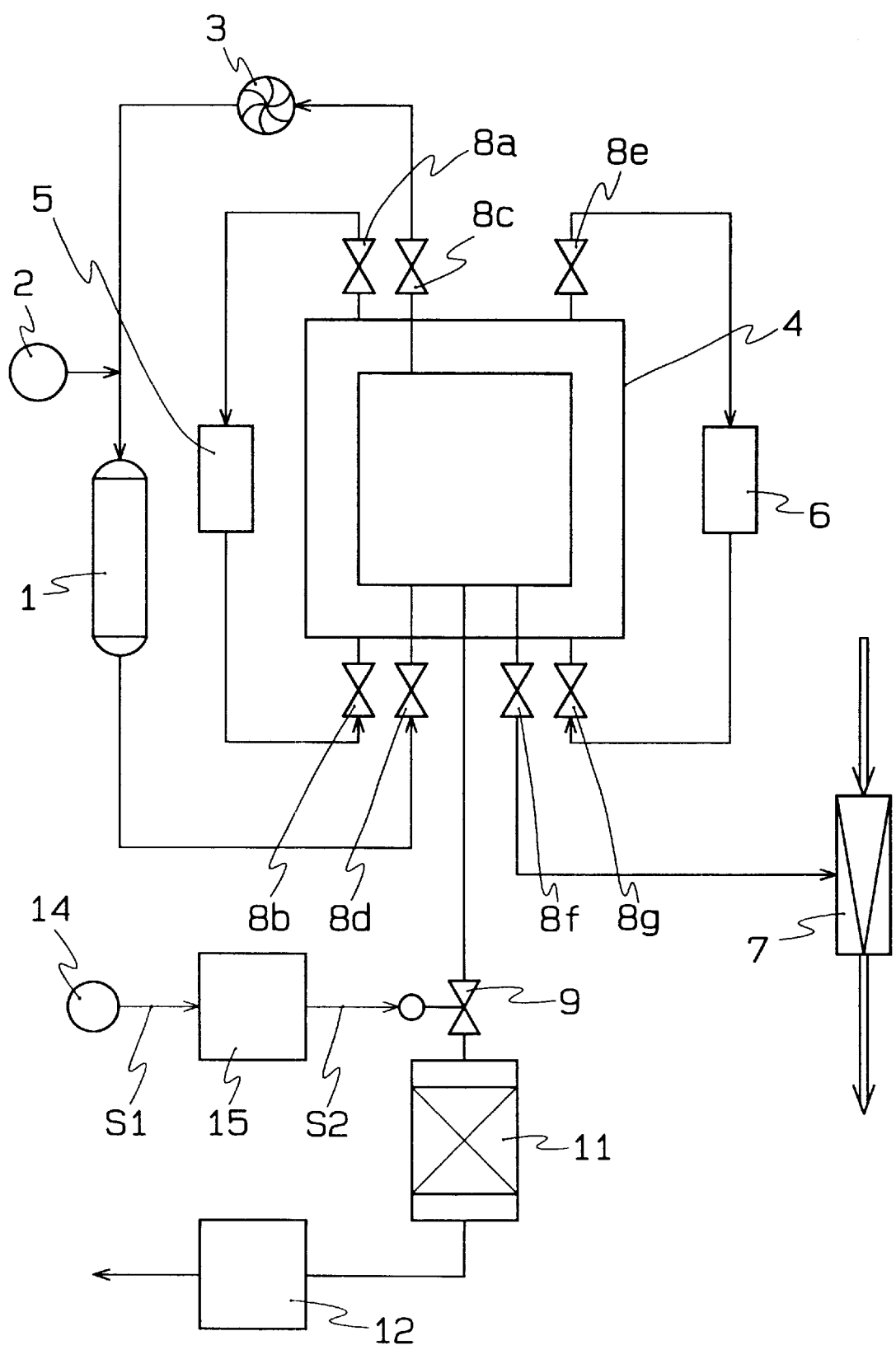
FIG. 6 is a diagram showing an arrangement of an ozone producing apparatus according to Embodiment 6 of the present invention.

FIG. 6 is a diagram showing an arrangement of an ozone producing apparatus according to Embodiment 6 of the present invention. The apparatus of this embodiment is arranged in such a manner that the reducer storage 10 of Embodiment 5 has been replaced by the filler 11 and the ozone decomposer 12 of Embodiment 2.

Operations of the apparatus of FIG. 6 are almost identical with those of the apparatus of FIG. 5. That is, electricity supply condition to the apparatus during driving is continuously monitored in this apparatus by the electricity supply condition monitor 14, and when power failure is detected, a corresponding signal is transmitted to the control circuit 15 via the signal line S1. The control circuit 15 sends immediately, or depending on the driving condition, an opening/closing or opening degree adjusting signal for the switch valve 9 to the switch valve 9 via the signal line S2, and based on this signal the opened/closed condition or the opening degree is controlled at the switch valve 9.

It should be noted that measures for monitoring electricity supply condition to the apparatus, for obtaining a lapsed time after power failure and for supplying power at the time of power failure might be easily performed at low cost, similarly to the apparatus of FIG. 5.

When electrical power has failed and the apparatus is under an abnormal driving condition, it is automatically detected that, for instance, electrical power has failed and the opening/closing condition or the opening degree of the switch valve 9 is controlled based on a corresponding signal thereof to draw ozone stored in the adsorption/desorption tower 4 for treatment. With this arrangement, adsorbed and stored ozone can be prevented from being rapidly decomposed also under an abnormal driving condition, and the apparatus can be safely driven.

Embodiment 7

Figure 7:
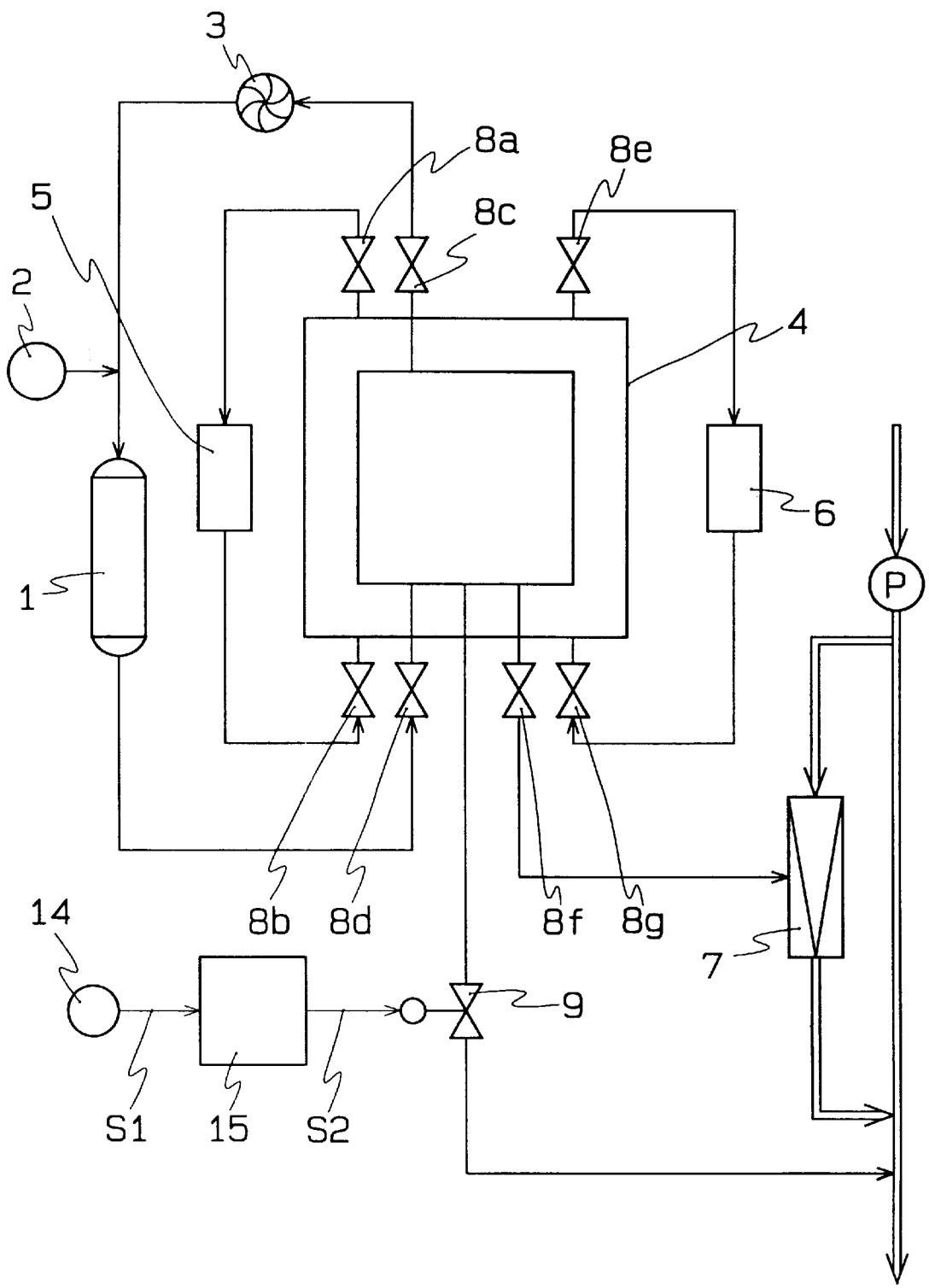
FIG. 7 is a diagram showing an arrangement of an ozone producing apparatus according to Embodiment 7 of the present invention.

FIG. 7 is a diagram showing an arrangement of an ozone producing apparatus according to Embodiment 7 of the present invention. The apparatus of this embodiment is arranged in such a manner that the monitoring means of Embodiments 5 and 6 is connected to the piping La of Embodiment 3.

Operations of the apparatus of FIG. 7 are almost identical with those of the apparatus of FIG. 6 and of the apparatus of FIG. 5. That is, the electricity supply condition to the apparatus during driving is continuously monitored in this apparatus by the electricity supply condition monitor 14, and when power failure is detected, a corresponding signal is transmitted to the control circuit 15 via the signal line S1. The control circuit 15 sends immediately, or depending on the driving condition, an opening/closing or opening degree adjusting signal for the switch valve 9 to the switch valve 9 via the signal line S2, and based on this signal the opened/closed condition or the opening degree is controlled at the switch valve 9.

It should be noted that measures for monitoring electricity supply condition to the apparatus, for obtaining a lapsed time after power failure and for supplying power at the time of power failure might be easily performed at low cost, similarly to the apparatuses of FIGS. 5 and 6.

When electrical power has failed and the apparatus is under an abnormal driving condition, it is automatically detected that, for instance, electrical power has failed and the opening/closing condition or the opening degree of the switch valve 9 is controlled based on a corresponding signal thereof to draw ozone stored in the adsorption/desorption tower 4 for treatment. With this arrangement, adsorbed and stored ozone can be prevented from being rapidly decomposed also under an abnormal driving condition, and the apparatus can be safely driven.

Embodiment 8

Figure 8:
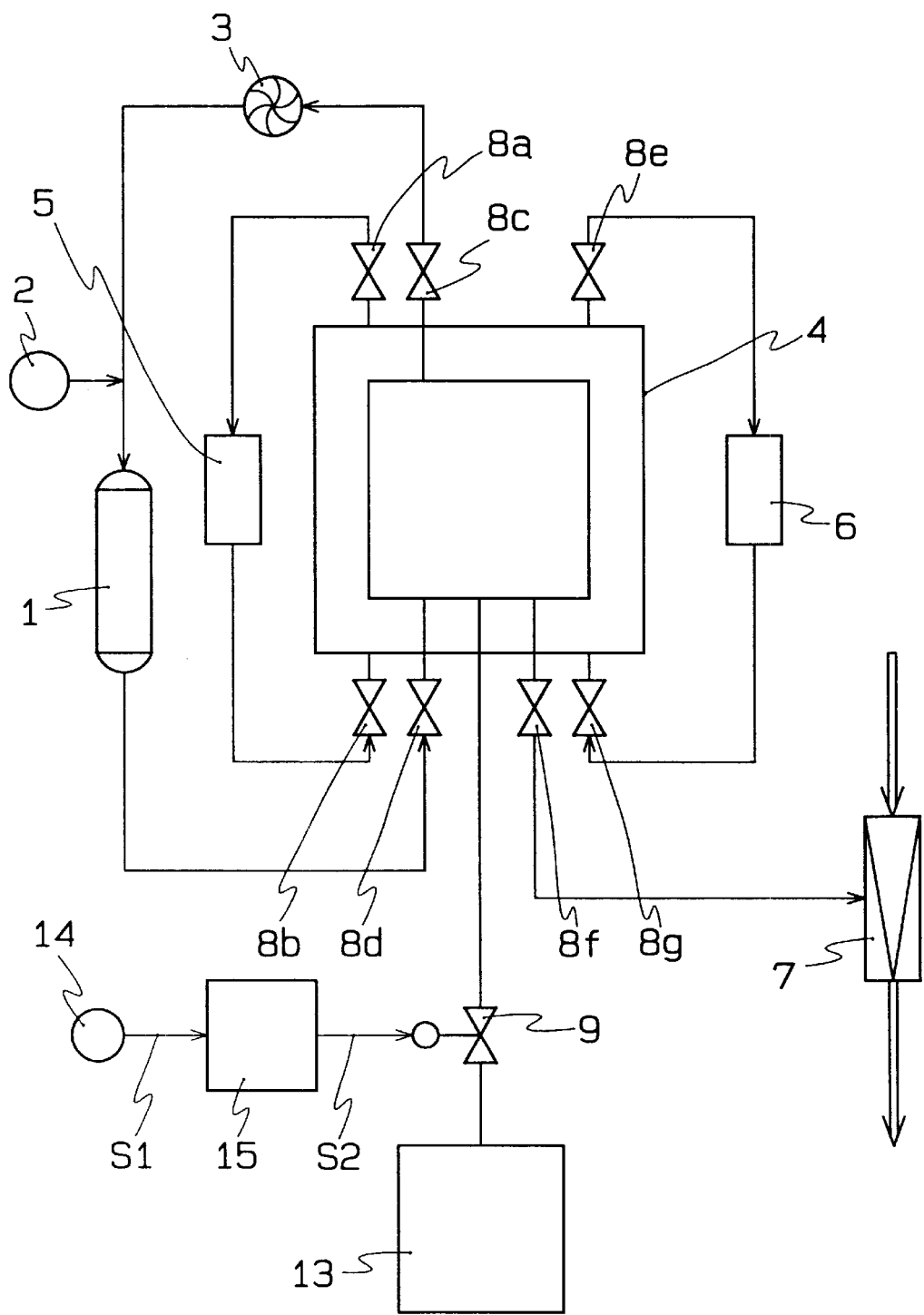
FIG. 8 is a diagram showing an arrangement of an ozone producing apparatus according to Embodiment 8 of the present invention.

FIG. 8 is a diagram showing an arrangement of an ozone producing apparatus according to Embodiment 8 of the present invention. The apparatus of this embodiment is arranged in such a manner that the monitoring means of Embodiments 5 to 7 is connected to the piping La of Embodiment 4.

Operations of the apparatus of FIG. 8 are almost identical with those of the apparatuses of FIGS. 5 to 7. That is, the electricity supply condition to the apparatus during driving is continuously monitored in this apparatus by the electricity supply condition monitor 14, and when power failure is detected, a corresponding signal is transmitted to the control circuit 15 via the signal line S1. The control circuit 15 sends immediately, or depending on the driving condition, an opening/closing or opening degree adjusting signal for the switch valve 9 to the switch valve 9 via the signal line S2, and based on this signal the opened/closed condition or the opening degree is controlled at the switch valve 9.

It should be noted that measures for monitoring electricity supply condition to the apparatus, for obtaining a lapsed time after power failure and for supplying power at the time of power failure might be easily performed at low cost, similarly to the apparatuses of FIGS. 5 to 7.

When electrical power has failed and the apparatus is under an abnormal driving condition, it is automatically detected that, for instance, electrical power has failed and the opening/closing condition or the opening degree of the switch valve 9 is controlled based on a corresponding signal thereof to draw ozone stored in the adsorption/desorption tower 4 to the gas storage 13 for storing. With this arrangement, adsorbed and stored ozone can be prevented from being rapidly decomposed even in case of power failure, and adsorbed ozone can be made good use of. Further, it is sufficient to provide a switch valve, piping and a gas tank in this embodiment, whereby the apparatus can be simplified.

Embodiment 9

Figure 9:
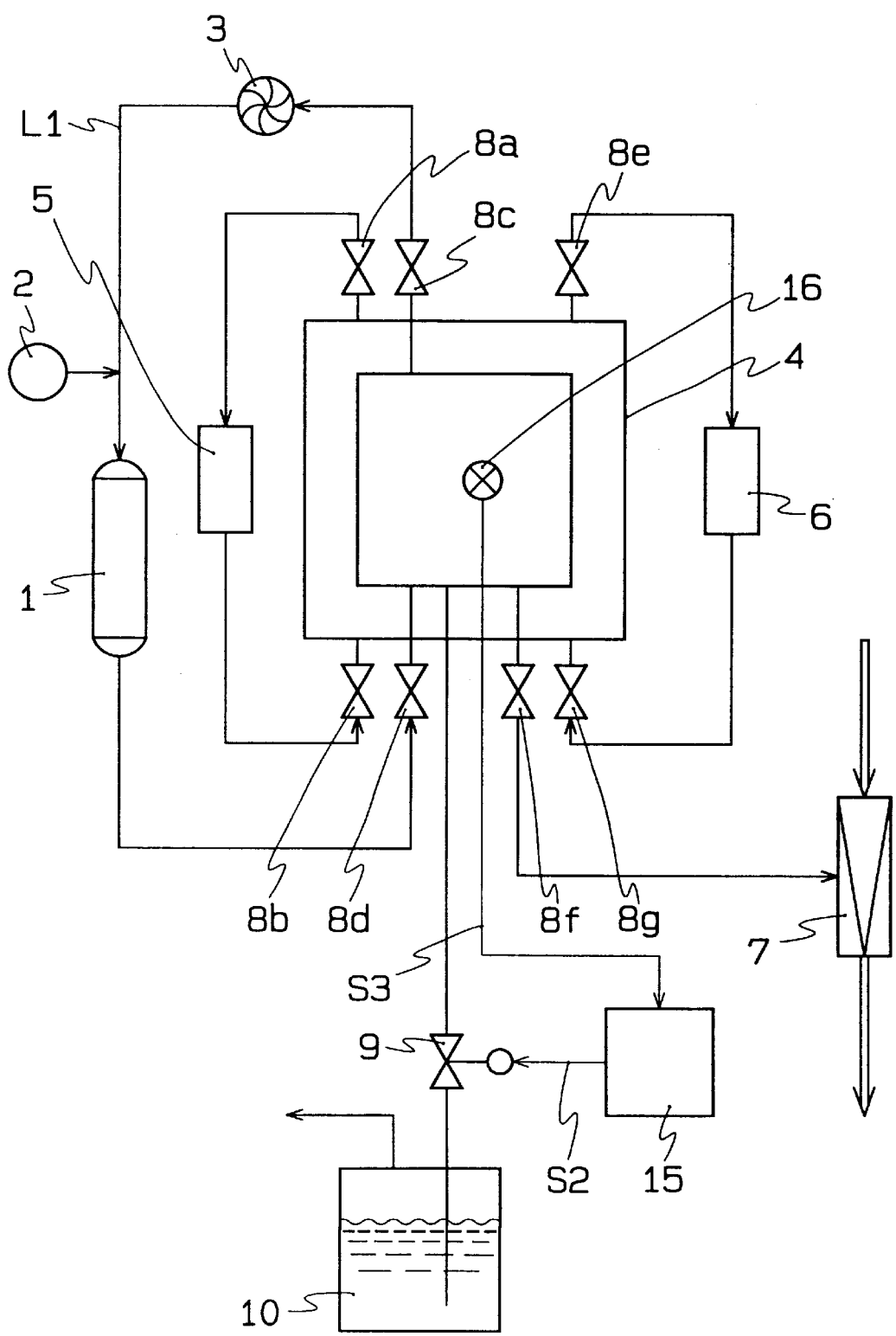
FIG. 9 is a diagram showing an arrangement of an ozone producing apparatus according to Embodiment 9 of the present invention.

FIG. 9 is a diagram showing an arrangement of an ozone producing apparatus according to Embodiment 9 of the present invention. The apparatus of FIG. 9 includes a pressure detecting means, and numeral 16 denotes a pressure gauge for measuring an internal pressure in the adsorption/desorption tower 4, and S3 a signal line. An output signal of the pressure gauge 16 is connected to an input of the control circuit 15 via the signal line S3, and an output of the control circuit 15 is connected to the switch valve 9 via the signal line S2 as an opening/closing signal for the switch valve 9. The remaining arrangements are identical with those of FIG. 1 and FIG. 5.

Operations of the apparatus of FIG. 9 will now be explained. In this apparatus, the internal pressure of the adsorption/desorption tower 4 is continuously monitored by the pressure gauge 16, and a corresponding signal is transferred to the control circuit 15 via the signal line S3. The control circuit 15 sends an opening/closing or opening degree adjusting signal for the switch valve 9 to the switch valve 9 via the signal line S2 when the obtained valve of the pressure gauge 16 is deviated from a predetermined suitable pressure range for each driving process. The switch valve 9 is then controlled based on this signal to change its opened/closed condition or its opening degree. It should be noted that a predetermined suitable pressure range for each driving process indicates the followings: this apparatus is an apparatus for producing ozone by repeating an ozone adsorbing and storing process and an ozone desorbing process, and conditions for the driving pressure are different between the ozone adsorbing and storing process, and the desorbing process. That is, adsorption is normally performed in the presence of pressure and desorption in the presence of negative pressure. Therefore, a more delicate measure for coping with abnormal driving conditions might be performed by setting different pressure ranges between the ozone adsorbing and storing process, and the desorbing process.

The suitable pressure ranges for each of the driving processes can be preliminarily set based on experiments, pressure resistivity of the adsorption/desorption tower 4, driving pressure of the ozone generator (set pressure for the piping L1 during adsorbing and storing process), or vacuum reaching pressure of the ejector 7. During the adsorbing process, the driving pressure for the ozone generator or, when a pressure rising blower is provided (though not shown in the drawings) a driving discharge power thereof, is made to be the suitable driving condition, and during the desorbing process, the vacuum pressure reaching pressure of the ejector or, when of performing gas purge (though not shown in the drawings), the pressure of supplied gas is made to be the suitable driving condition. While a range of suitable driving conditions might be set by adding upper and lower surpluses to these driving conditions, they might be set, in view of the performance, utility or costs for each of the present devices, in a range of 0 to 20 kg/cm$^2$G, and preferably 0 to 12 kg/cm$^2$G for the adsorbing process, and in a range of 0 to 1 kg/cm$^2$ABS, and preferably 0.01 to 0.5 kg/cm$^2$ABS for the desorbing process.

The pressure in the adsorption/desorption tower 4 is automatically measured and the opening/closing condition or the opening degree of the switch valve 9 is controlled based on the obtained pressure signal and a predetermined suitable pressure range for the driving process in order to draw ozone stored in the adsorption/desorption tower 4 even in the case where the pressure in the adsorption/desorption tower 4 is deviated from a suitable range for the driving condition and the apparatus is under an abnormal driving condition. With this arrangement, adsorbed and stored ozone is prevented from being rapidly decomposed even under an abnormal driving condition, and safe driving can be performed.

Embodiment 10

Figure 10:
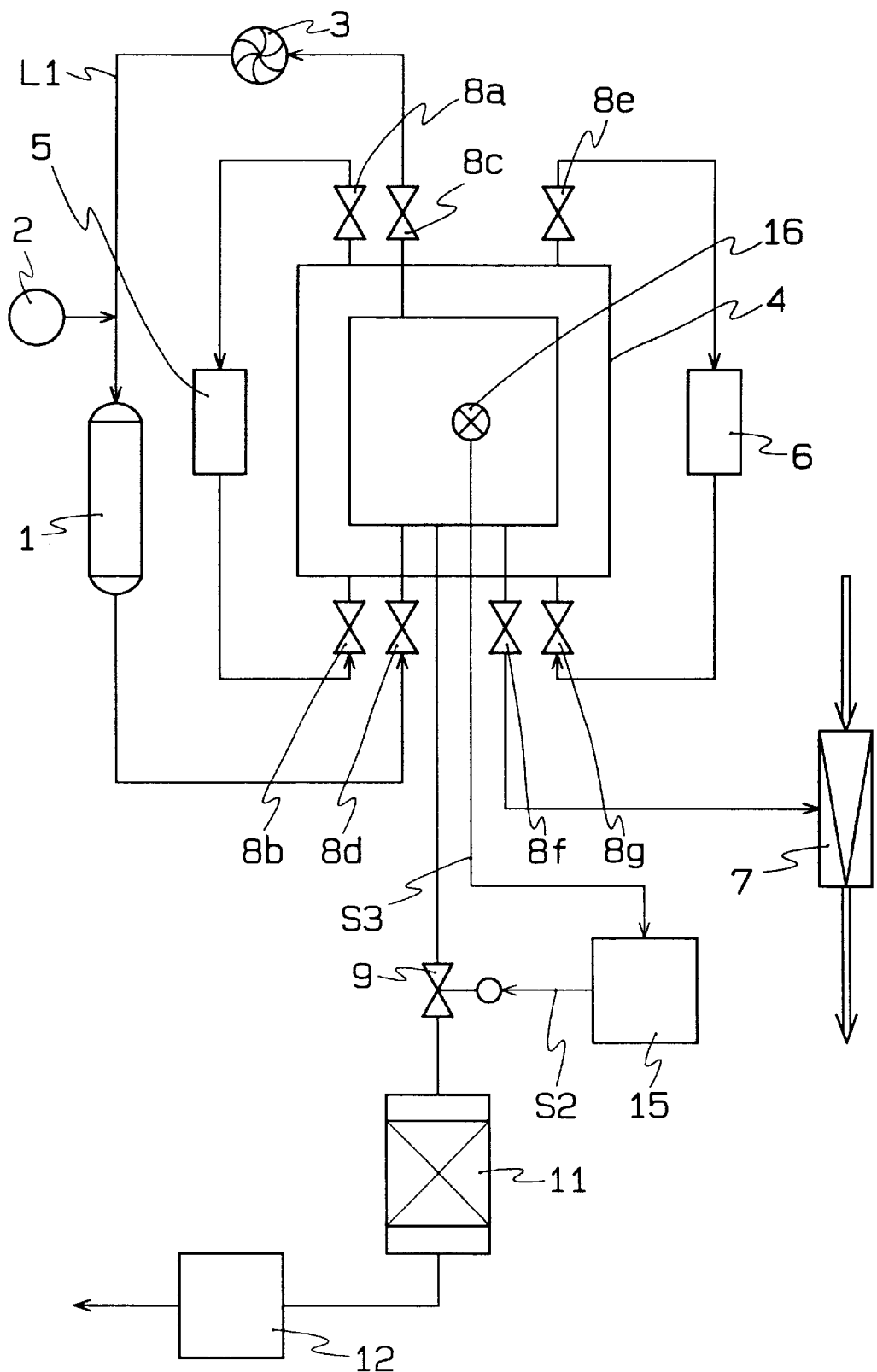
FIG. 10 is a diagram showing an arrangement of an ozone producing apparatus according to Embodiment 10 of the present invention.

FIG. 10 is a diagram showing an arrangement of an ozone producing apparatus according to Embodiment 10 of the present invention. The apparatus of this embodiment is arranged in such a manner that the reducer storage 10 of Embodiment 9 is replaced by the silica gel filler 11 and ozone decomposer 12 of Embodiment 2. Operations of the apparatus of FIG. 10 are almost identical with those of the apparatus of FIG. 9. That is, the internal pressure in the adsorption/desorption tower 4 is continuously monitored by the pressure gauge 16, and the obtained value is supplied to the control circuit 15 via the signal line S3. The control circuit 15 compares the internal pressure in the adsorption/desorption tower 4 obtained as a measured value of the pressure gauge 16 and a suitable pressure range which is preliminarily set for each of the ozone adsorbing process and ozone desorbing process. When the measured value of the pressure gauge 16 is deviated from this range, an opening/closing condition or opening degree adjusting signal for the switch valve 9 is sent to the switch valve 9 via the signal line S2. Based upon this signal, the opening/closing condition or opening degree is controlled at the switch valve 9.

The suitable pressure ranges for each of the driving processes can be preliminarily set based on experiments, pressure resistivity of the adsorption/desorption tower 4, driving pressure of the ozone generator (set pressure for the piping L1 during adsorbing and storing process), or vacuum reaching pressure of the ejector 7, similarly to the apparatus of FIG. 9.

The pressure in the adsorption/desorption tower 4 is automatically measured and the opening/closing condition or the opening degree of the switch valve 9 is controlled based on the obtained pressure signal and a predetermined suitable pressure range for the driving process in order to draw ozone stored in the adsorption/desorption tower 4 even in the case where the pressure in the adsorption/desorption tower 4 is deviated from a suitable range for the driving condition and the apparatus is under an abnormal driving condition. With this arrangement, adsorbed and stored ozone is prevented from being rapidly decomposed even under an abnormal driving condition, and safe driving can be performed.

Embodiment 11

Figure 11:
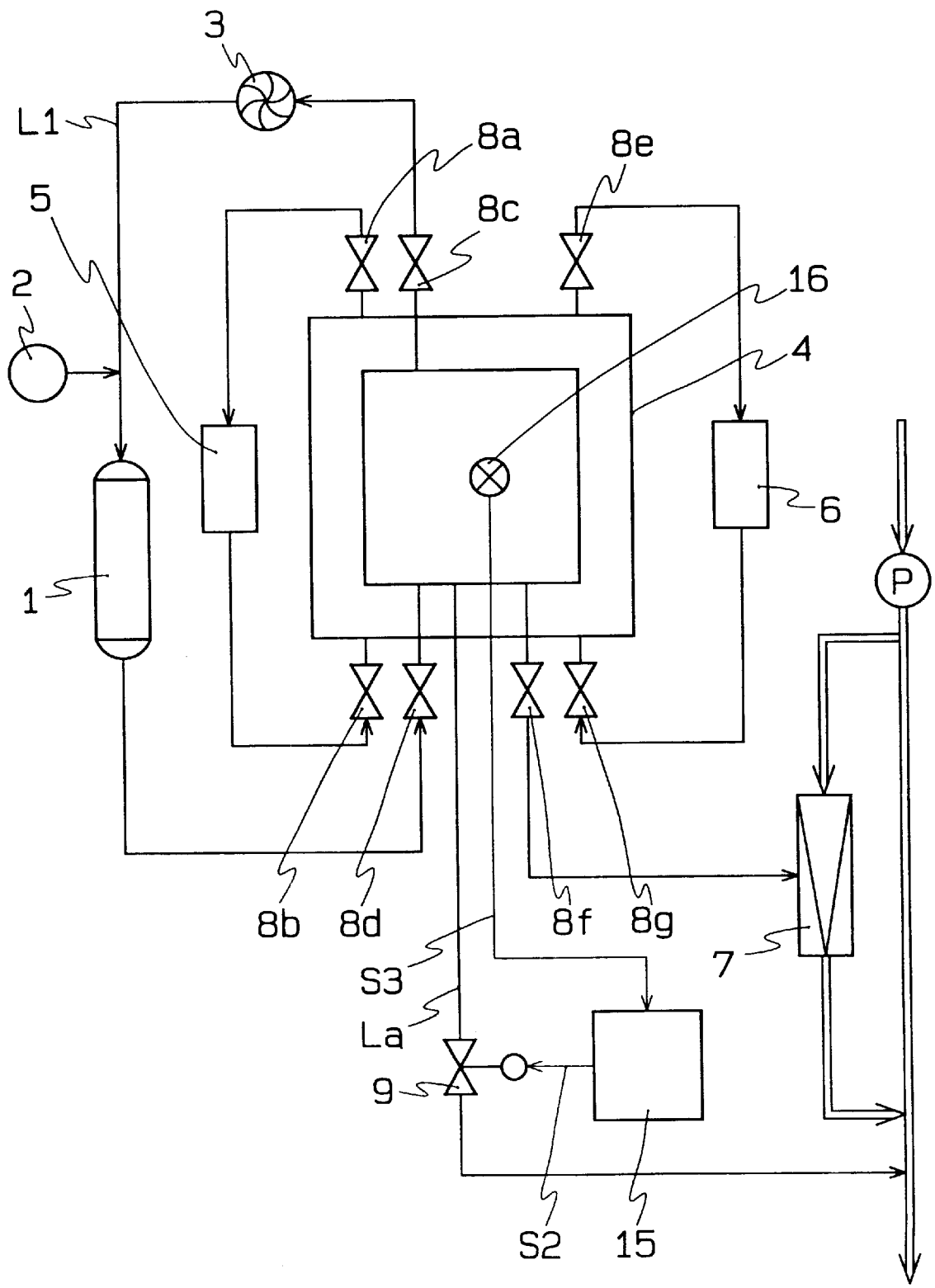
FIG. 11 is a diagram showing an arrangement of an ozone producing apparatus according to Embodiment 11of the present invention.

FIG. 11 is a diagram showing an arrangement of an ozone producing apparatus according to Embodiment 11 of the present invention. The apparatus of this embodiment is arranged in such a manner that the pressure detecting means of Embodiment 9 and 10 is connected to the piping La of Embodiment 3. Operations of the apparatus of FIG. 11 are almost identical with those of the apparatus of FIG. 10 and the apparatus of FIG. 9, wherein the internal pressure in the adsorption/desorption tower 4 during driving is continuously monitored by the pressure gauge, and the obtained value is supplied to the control circuit 15 via the signal line S3. The control circuit 15 compares the internal pressure in the adsorption/desorption tower 4 obtained as a measured value of the pressure gauge 16 and a predetermined suitable pressure range for each of the ozone adsorbing process and ozone desorbing process. When the measured value of the pressure gauge 16 is deviated from this range, an opening/closing condition or opening degree adjusting signal for the switch valve 9 is sent to the switch valve 9 via the signal line S2. Based upon this signal, the opening/closing condition or opening degree is controlled at the switch valve 9.

It should be noted that the suitable pressure ranges for each of the driving processes can be preliminarily set based on experiments, pressure resistivity of the adsorption/desorption tower 4, driving pressure of the ozone generator (set pressure for the piping L1 during adsorbing and storing process), or vacuum reaching pressure of the ejector 7, similarly to the apparatuses of FIGS. 9 and 10.

The pressure in the adsorption/desorption tower 4 is automatically measured and the opening/closing condition or the opening degree of the switch valve 9 is controlled based on the obtained pressure signal and a predetermined suitable pressure range for the driving process in order to draw ozone stored in the adsorption/desorption tower 4 even in the case where the pressure in the adsorption/desorption tower 4 is deviated from a suitable range for the driving condition and the apparatus is under an abnormal driving condition. With this arrangement, adsorbed and stored ozone is prevented from being rapidly decomposed even under an abnormal driving condition, and safe driving can be performed.

Embodiment 12

Figure 12:
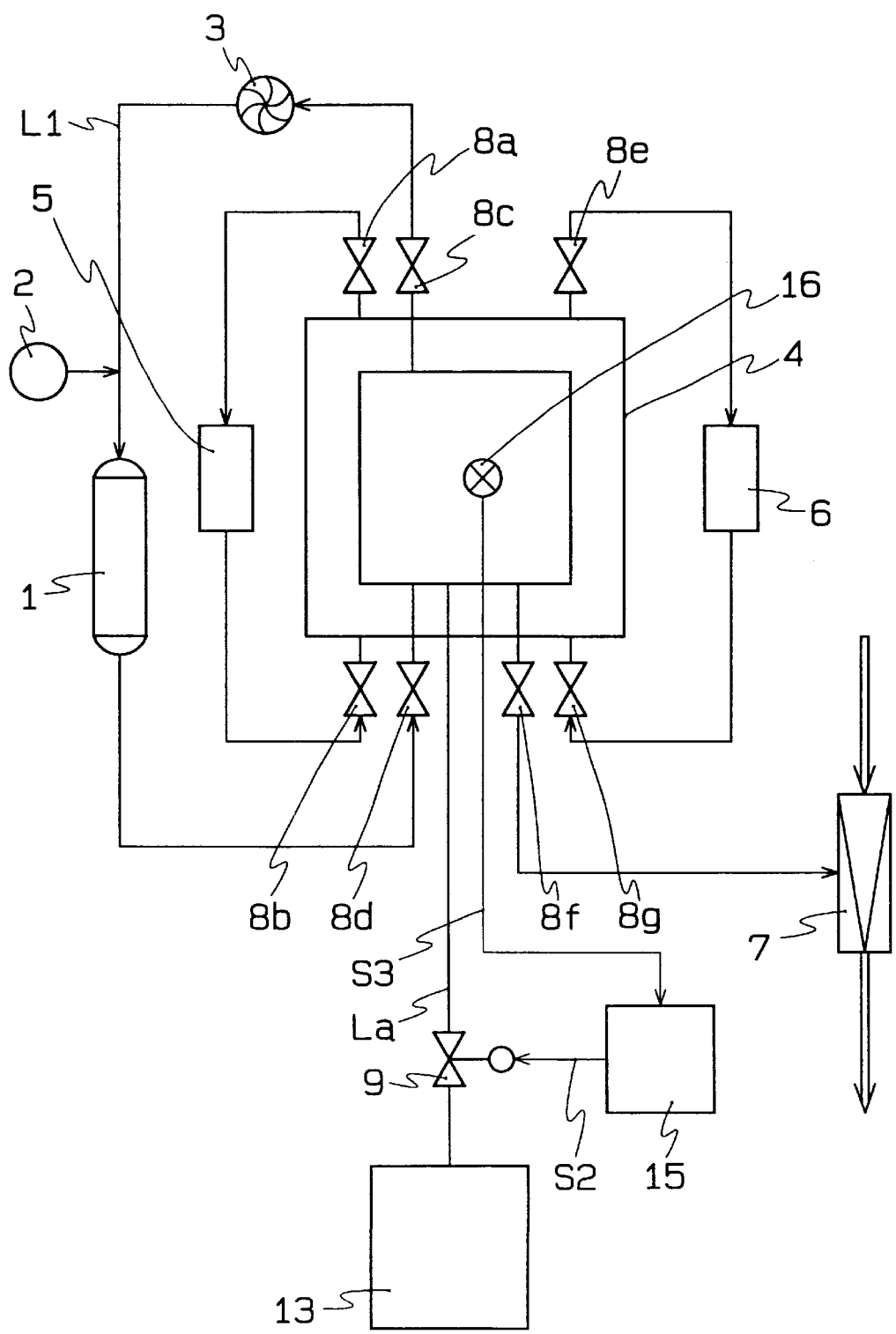
FIG. 12 is a diagram showing an arrangement of an ozone producing apparatus according to Embodiment 12 of the present invention.

FIG. 12 is a diagram showing an arrangement of an ozone producing apparatus according to Embodiment 12 of the present invention. The apparatus of this embodiment is arranged in such a manner that the pressure detecting means of Embodiments 9 to 11 is connected to the piping La of Embodiment 4. Operations of the apparatus of FIG. 12 are almost identical with those of the apparatuses of FIGS. 9 to 11, wherein the internal pressure in the adsorption/desorption tower 4 during driving is continuously monitored by the pressure gauge 16, and the obtained value is supplied to the control circuit 15 via the signal line S3. The control circuit 15 compares the internal pressure in the adsorption/desorption tower 4 obtained as a measured value of the pressure gauge 16 and a predetermined suitable pressure range for each of the ozone adsorbing process and ozone desorbing process. When the measured value of the pressure gauge 16 is deviated from this range, an opening/closing condition or opening degree adjusting signal for the switch valve 9 is sent to the switch valve 9 via the signal line S2. Based upon this signal, the opening/closing condition or opening degree is controlled at the switch valve 9.

It should be noted that the suitable pressure ranges for each of the driving processes can be preliminarily set based on experiments, pressure resistivity of the adsorption/desorption tower 4, driving pressure of the ozone generator (set pressure for the piping L1 during adsorbing and storing process), or vacuum reaching pressure of the ejector 7, similarly to the apparatuses of FIGS. 9 and 10.

The pressure in the adsorption/desorption tower 4 is automatically measured and the opening/closing condition or the opening degree of the switch valve 9 is controlled based on the obtained pressure signal and a predetermined suitable pressure range for the driving process in order to draw ozone stored in the adsorption/desorption tower 4 for storing in the gas storage 13 even in the case where the pressure in the adsorption/desorption tower 4 is deviated from a suitable range for the driving condition, and the apparatus is under an abnormal driving condition. With this arrangement, explosion, fire or destruction of the apparatus can be prevented and adsorbed ozone can be made good use even in the case where the pressure is deviated from a suitable range.

Embodiment 13

Figure 13:
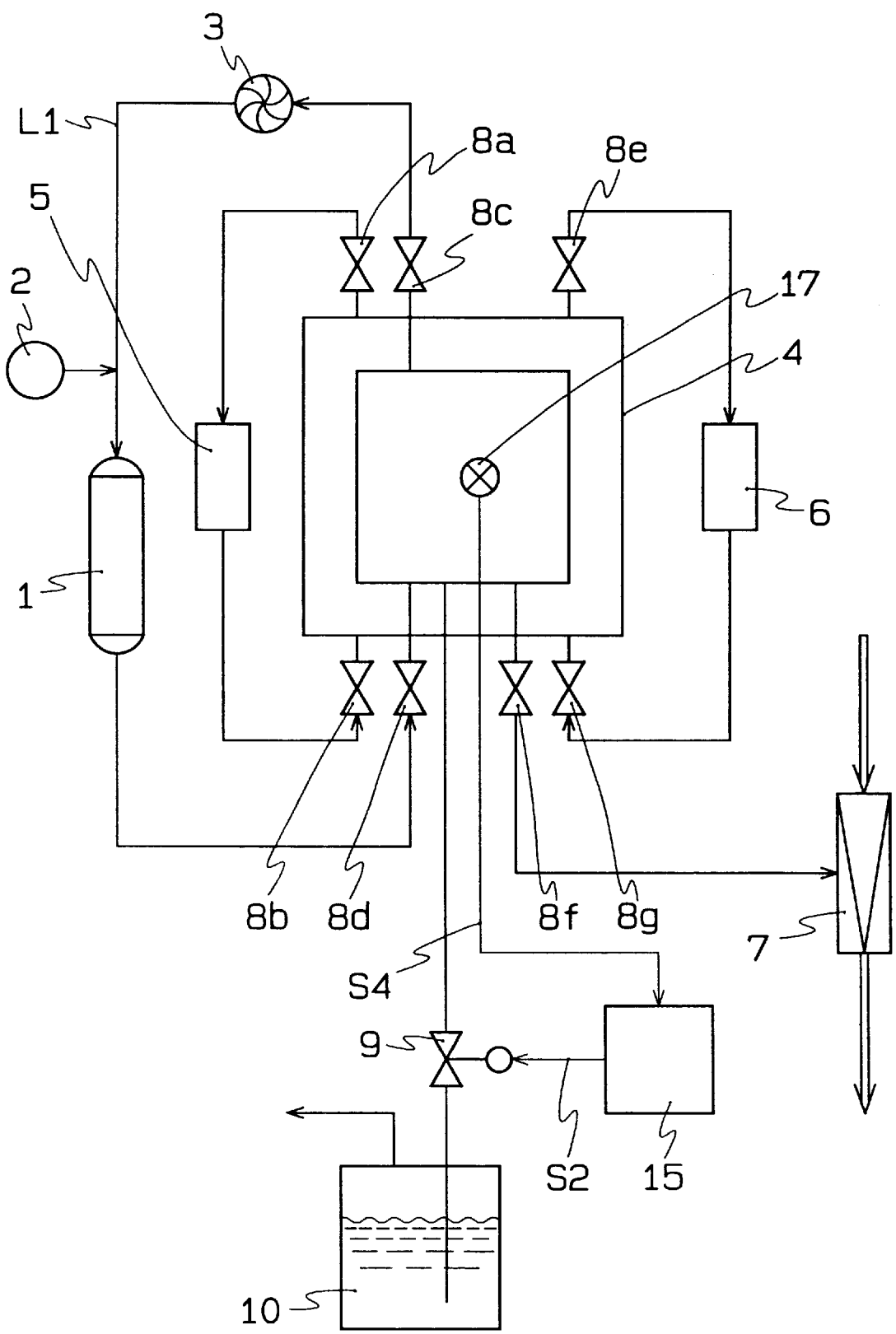
FIG. 13 is a diagram showing an arrangement of an ozone producing apparatus according to Embodiment 13 of the present invention.

FIG. 13 is a diagram showing an arrangement of an ozone producing apparatus according to Embodiment 13 of the present invention. In FIG. 13, the apparatus includes a temperature detecting means, and numeral 17 denotes a thermometer for measuring an internal temperature of the adsorption/desorption tower 4, and S4 a signal line. An output signal of the thermometer 17 is connected to an input of the control circuit 15 via the signal line S4, and an output of the control circuit 15 is connected to the switch valve 9 via the signal line S2 as an opening/closing signal for the switch valve 9. The remaining arrangements are identical with those of the apparatuses of FIGS. 1, 5 and 9.

Operations of the apparatus of FIG. 13 will now be explained. In this apparatus, the internal temperature of the adsorption/desorption tower 4 is continuously monitored by the thermometer 17, and a corresponding signal is transferred to the control circuit 15 via the signal line S4. The control circuit 15 sends an opening/closing or opening degree adjusting signal for the switch valve 9 to the switch valve 9 via the signal line S2 when the obtained valve of the thermometer 17 is deviated from a predetermined suitable temperature range for each driving process, and the switch valve 9 is then controlled based on this signal to change its opened/closed condition or its opening degree.

It should be noted that the suitable temperature ranges for each of the driving processes can be preliminarily set based on experiments, set temperature for the cooling source 5, set temperature for the heating source 6, or an adsorption/desorption heat quantity of ozone with respect to silica gel or the like. It should be noted that a predetermined suitable temperature range for each driving process indicates the followings: this apparatus is an apparatus for producing ozone by repeating an ozone adsorbing and storing process and an ozone desorbing process, and the driving temperatures differ between the adsorbing process and the desorbing process. In this embodiment, the adsorbing process is generally performed at a low temperature and the desorbing process generally at a room temperature. While suitable driving ranges might be set by adding upper and lower surpluses to set temperatures for each of the devices, in view of efficiency of the cooling source, ozone adsorbing capacity to silica gel, and initial and running cost for each device, a practical temperature range might be set in a range of 30° C. to −100° C. in the adsorbing process and 80° C. to −100° C. in the desorbing process.

The temperature in the adsorption/desorption tower 4 is automatically measured and the opening/closing condition or the opening degree of the switch valve 9 is controlled based on the obtained temperature signal and a predetermined suitable temperature range for the driving process in order to draw ozone stored in the adsorption/desorption tower 4 even in the case where the temperature in the adsorption/desorption tower 4 is deviated from a suitable range for the driving condition and the apparatus is under an abnormal driving condition. With this arrangement, adsorbed and stored ozone is prevented from being rapidly decomposed even under an abnormal driving condition, and safe driving can be performed.

Embodiment 14

Figure 14:
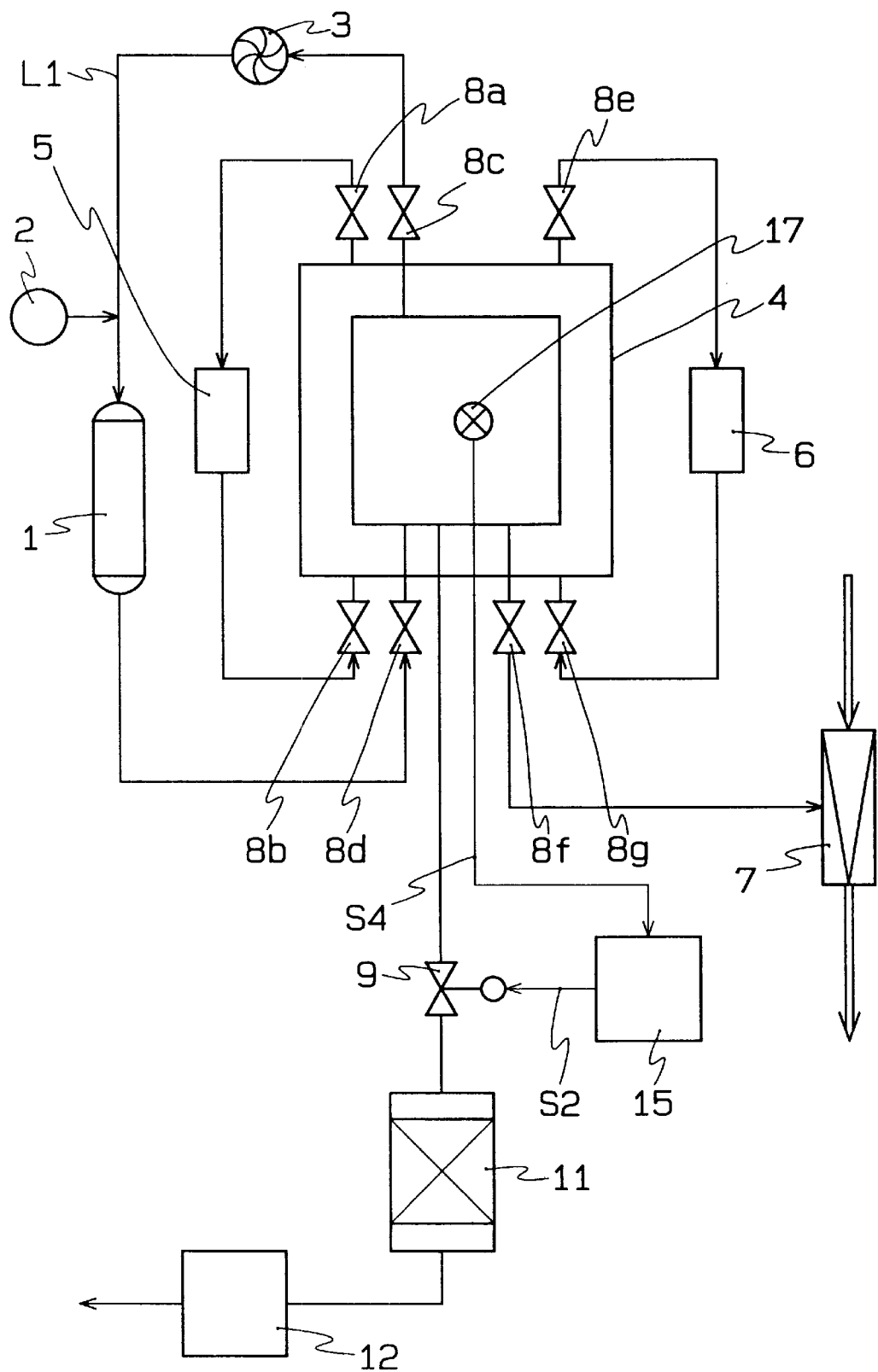
FIG. 14 is a diagram showing an arrangement of an ozone producing apparatus according to Embodiment 14 of the present invention.

FIG. 14 is a diagram showing an arrangement of an ozone producing apparatus according to Embodiment 14 of the present invention. The apparatus of this embodiment is arranged in such a manner that the reducer storage 10 of Embodiment 13 is replaced by the silica gel filler 11 and ozone decomposer 12 of Embodiment 2. Operations of the apparatus of FIG. 14 are almost identical with those of the apparatus of FIG. 13. That is, the internal temperature in the adsorption/desorption tower 4 is continuously monitored by the thermometer 17, and the obtained value is supplied to the control circuit 15 via the signal line S4. The control circuit 15 compares the internal temperature in the adsorption/desorption tower 4 obtained as a measured value of the thermometer 17 and a predetermined suitable temperature range for each of the ozone adsorbing process and ozone desorbing process. When the measured value of the thermometer 17 is deviated from this range, an opening/closing condition or opening degree adjusting signal for the switch valve 9 is sent to the switch valve 9 via the signal line S2. Based upon this signal, the opening/closing condition or opening degree is controlled at the switch valve 9.

It should be noted that the suitable temperature ranges for each of the driving processes can be preliminarily set based on experiments, set temperature for the cooling source 5, set temperature for the heating source 6, or an adsorption/desorption heat quantity of ozone with respect to silica gel or the like, similarly to the apparatus of Embodiment 13.

The temperature in the adsorption/desorption tower 4 is automatically measured and the opening/closing condition or the opening degree of the switch valve 9 is controlled based on the obtained temperature signal and a predetermined suitable temperature range for the driving process in order to draw ozone stored in the adsorption/desorption tower 4 even in the case where the temperature in the adsorption/desorption tower 4 is deviated from a suitable range for the driving condition and the apparatus is under an abnormal driving condition. With this arrangement, adsorbed and stored ozone is prevented from being rapidly decomposed even under an abnormal driving condition, and safe driving can be performed.

Embodiment 15

Figure 15:
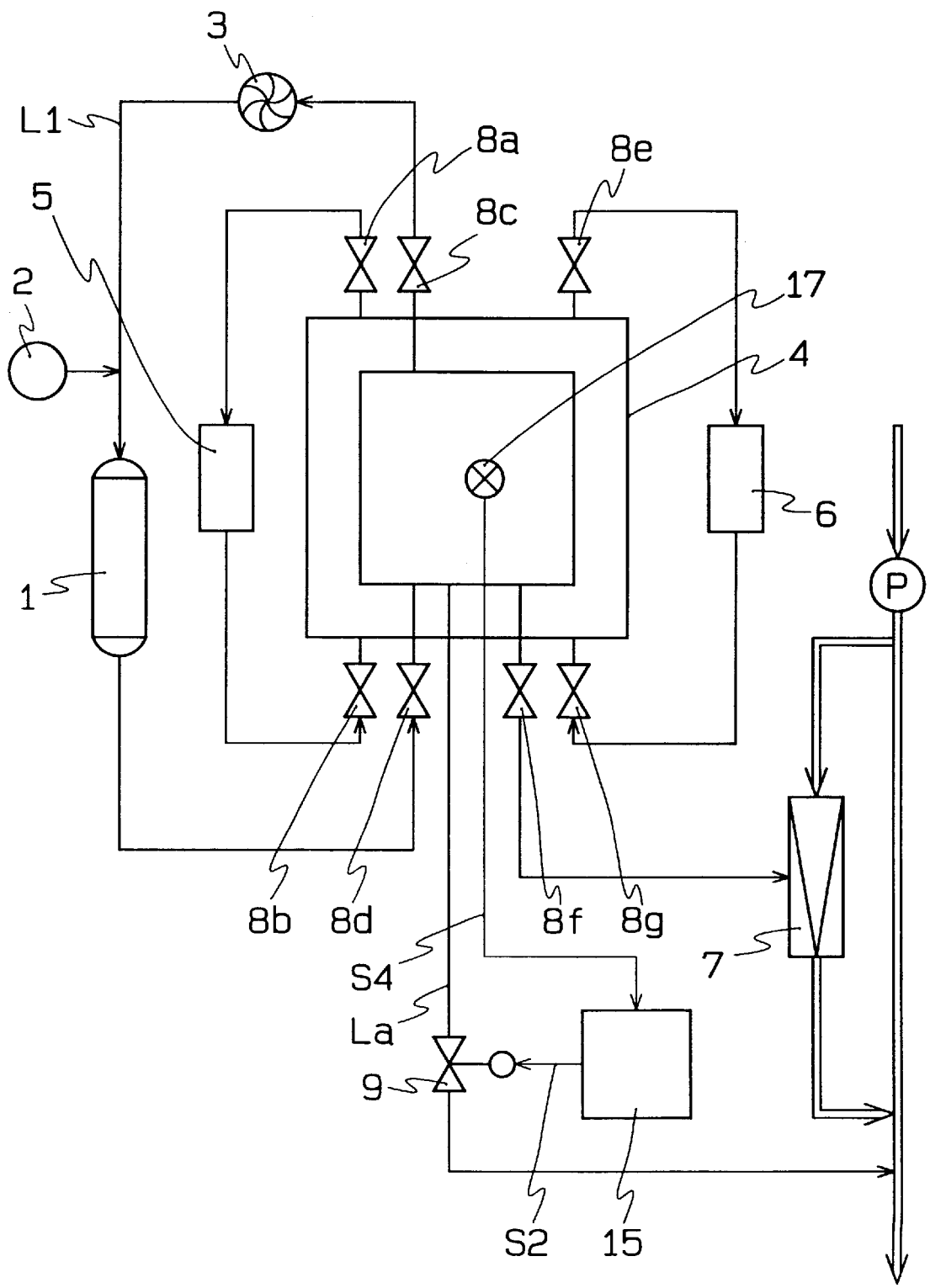
FIG. 15 is a diagram showing an arrangement of an ozone producing apparatus according to Embodiment 15 of the present invention.

FIG. 15 is a diagram showing an arrangement of an ozone producing apparatus according to Embodiment 15 of the present invention. The apparatus of this embodiment is arranged in such a manner that the temperature detecting means of Embodiments 13 and 14 is connected to the piping La of Embodiment 3. Operations of the apparatus of FIG. 15 are almost identical with those of the apparatus of FIG. 14 and the apparatus of FIG. 13. That is, the internal temperature in the adsorption/desorption tower 4 is continuously monitored by the thermometer 17, and the obtained value is supplied to the control circuit 15 via the signal line S4. The control circuit 15 compares the internal temperature in the adsorption/desorption tower 4 obtained by the thermometer 17 and a predetermined suitable temperature for each of the ozone adsorbing process and ozone desorbing process. When the measured value of the thermometer 17 is deviated from this range, a signal is sent to the switch valve 9 and based on this signal the switch valve 9 controls the opening/closing condition or opening degree.

It should be noted that the suitable temperature ranges for each of the driving processes can be preliminarily set based on experiments, set temperature for the cooling source 5, set temperature for the heating source 6, or an adsorption/desorption heat quantity of ozone with respect to silica gel or the like, similarly to the apparatuses of Embodiments 13 and 14.

The temperature in the adsorption/desorption tower 4 is automatically measured and the opening/closing condition or the opening degree of the switch valve 9 is controlled based on the obtained temperature signal and a predetermined suitable temperature range for the driving process in order to draw ozone stored in the adsorption/desorption tower 4 even in the case where the temperature in the adsorption/desorption tower 4 is deviated from a suitable range for the driving condition and the apparatus is under an abnormal driving condition. With this arrangement, adsorbed and stored ozone is prevented from being rapidly decomposed even under an abnormal driving condition, and safe driving can be performed.

Embodiment 16

Figure 16:
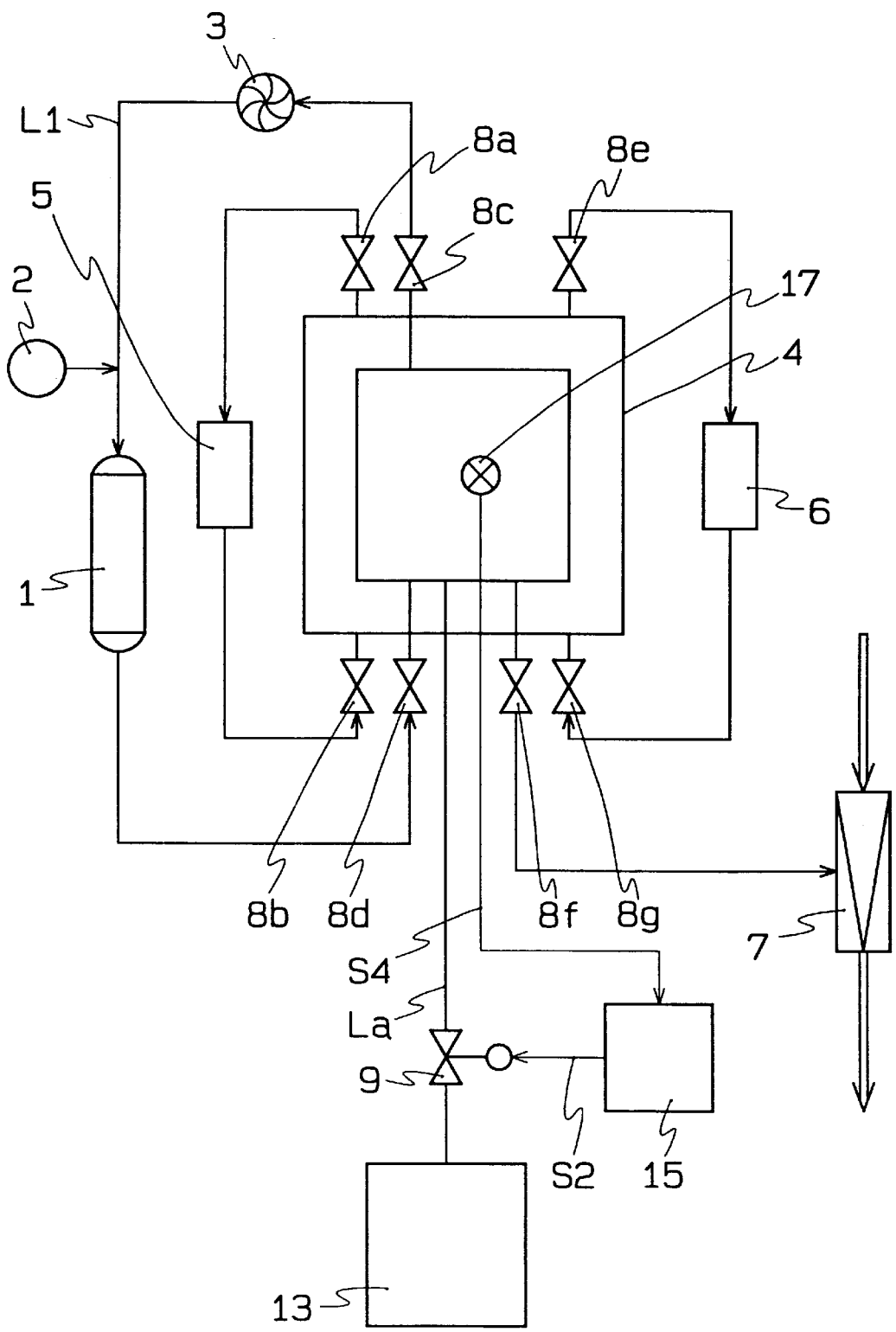
FIG. 16 is a diagram showing an arrangement of an ozone producing apparatus according to Embodiment 16 of the present invention.

FIG. 16 is a diagram showing an arrangement of an ozone producing apparatus according to Embodiment 16 of the present invention. The apparatus of this embodiment is arranged in such a manner that the temperature detecting means of Embodiments 13 to 15 is connected to the piping La of Embodiment 4. Operations of the apparatus of FIG. 16 are almost identical with those of the apparatuses of FIGS. 13 to 15. That is, the internal temperature in the adsorption/desorption tower 4 is continuously monitored by the thermometer 17, and the obtained value is supplied to the control circuit 15 via the signal line S4. The control circuit 15 compares the internal temperature in the adsorption/desorption tower 4 obtained by the thermometer 17 and a predetermined suitable temperature range for each of the ozone adsorbing process and ozone desorbing process. When the measured value of the thermometer 17 is deviated from this range, a signal is sent to the switch valve 9 and based on this signal the switch valve 9 controls the opening/closing condition or opening degree.

It should be noted that the suitable temperature ranges for each of the driving processes can be preliminarily set based on experiments, set temperature for the cooling source 5, set temperature for the heating source 6, or an adsorption/desorption heat quantity of ozone with respect to silica gel or the like, similarly to the apparatuses of Embodiments 13 and 14.

The temperature in the adsorption/desorption tower 4 is automatically measured and the opening/closing condition or the opening degree of the switch valve 9 is controlled based on the obtained temperature signal and a predetermined suitable temperature range for the driving process in order to draw ozone stored in the adsorption/desorption tower 4 for storing in the gas storage 13 even in the case where the temperature in the adsorption/desorption tower 4 is deviated from a suitable range for the driving condition and the apparatus is under an abnormal driving condition. With this arrangement, adsorbed and stored ozone is prevented from being rapidly decomposed, safe driving can be performed, and adsorbed ozone can be made good use of even under an abnormal driving condition.

Embodiment 17

Figure 17:
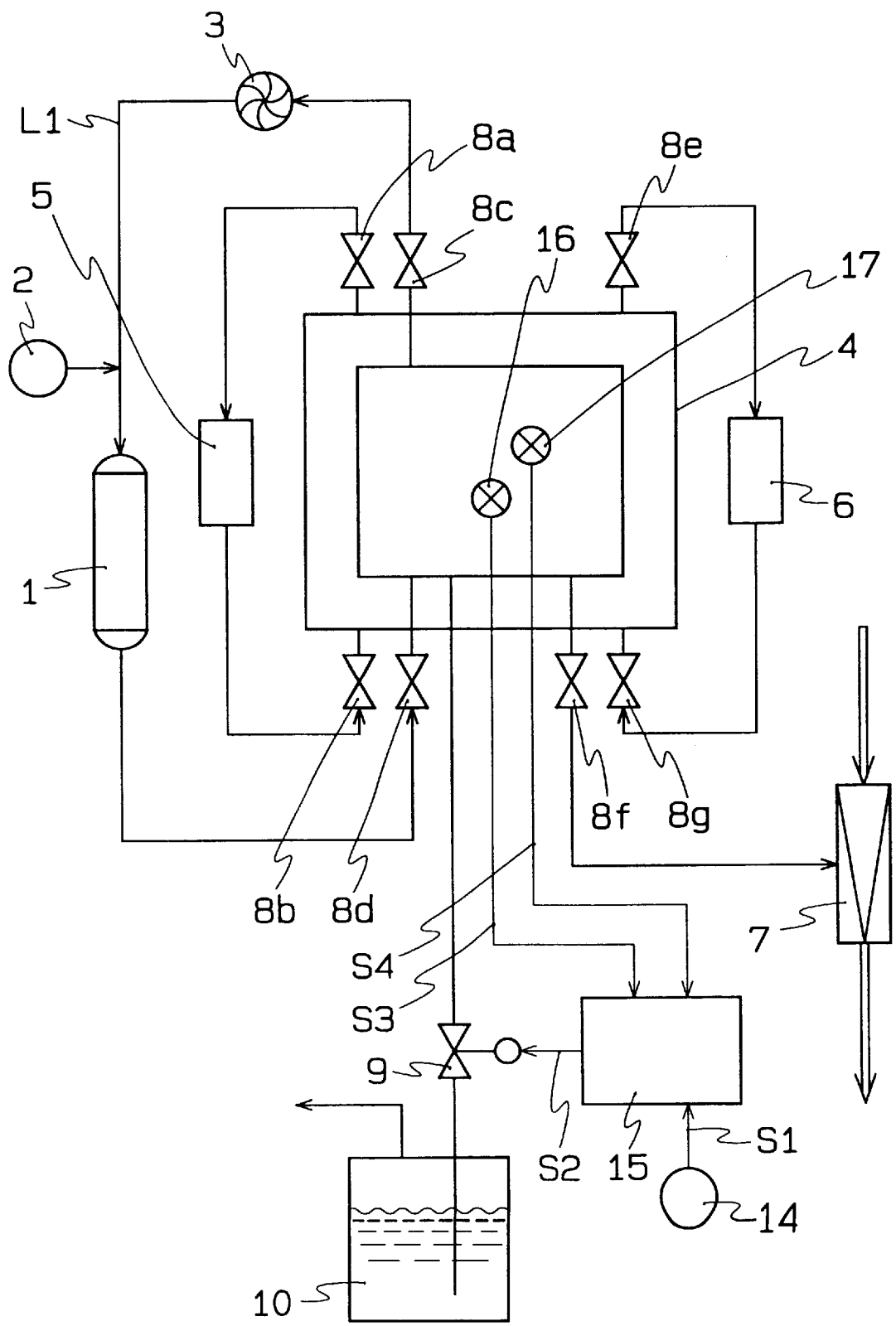
FIG. 17 is a diagram showing an arrangement of an ozone producing apparatus according to Embodiment 17 of the present invention.

FIG. 17 is a diagram showing an arrangement of an ozone producing apparatus according to Embodiment 17 of the present invention. The apparatus of this embodiment is arranged in such a manner that the pressure detecting means of Embodiment 9 and the temperature detecting means of Embodiment 13 are connected to the monitoring means of Embodiment 5. The remaining arrangements are identical with those of the apparatuses of FIGS. 1, 5, 9, and 13. In FIG. 17, an output signal of the electricity supply condition monitor 14, a measuring signal of the pressure gauge 16 and a signal of the thermometer 17 are simultaneously output to the control circuit 15 via the signal lines S1, S3 and S4, respectively.

Operations of the apparatus of FIG. 17 will now be explained. In this apparatus, the electricity supply condition to the apparatus is continuously monitored by the electricity supply condition monitor 14, the internal pressure in the adsorption/desorption tower 4 by the pressure gauge 16, and the internal temperature in the adsorption/desorption tower 4 by the thermometer 17. Output signals of these are transmitted to the control circuit 15 via the signal lines S1, S3 and S4, respectively. Based on the electricity supply condition, measured value of the pressure gauge 16, measured value of the thermometer 17 and the driving condition, an opening/closing or opening degree adjusting signal for the switch valve 9 is sent to the switch valve 9 via the signal line S2 when either of these values has deviated from a predetermined suitable driving condition range, and based on this signal the opening/closing condition or opening degree is controlled at the switch valve 9.

Monitoring of electricity supply condition to the apparatus might be performed, for instance, by utilizing a contact signal of a relay provided in the electricity supply line, and monitoring of a lapsed time after power failure might be performed by providing a timer in the control circuit 15. Further, supply of power at the time of power failure might be performed by using, for instance, a storage battery. Each of these measures can be performed easily and at low cost. The suitable pressure and temperature ranges for each of the driving processes can be preliminarily set based on experiments, pressure resistivity of the adsorption/desorption tower 4, driving pressure of the ozone generator (set pressure for the piping L1 during adsorbing and storing process), vacuum reaching pressure of the ejector 7, set temperature for the cooling source 5, set temperature for the heating source 6, or an adsorption/desorption heat quantity of ozone with respect to silica gel or the like.

The electricity supply condition to the apparatus, and pressure and temperature in the adsorption/desorption tower 4 are automatically measured, and the opening/closing condition or the opening degree of the switch valve 9 is controlled based on these measured signals and preliminarily set suitable driving condition ranges for the driving process in order to draw ozone stored in the adsorption/desorption tower 4 even in the case where electricity supply to the apparatus is terminated or where the pressure or temperature in the adsorption/desorption tower 4 is deviated from a suitable range for the driving condition and the apparatus is under an abnormal driving condition. With this arrangement, adsorbed and stored ozone is prevented from being rapidly decomposed even under an abnormal driving condition, and safe driving can be performed. It should be noted that by simultaneously monitoring electricity supply condition to the apparatus, and pressure and temperature in the adsorption/desorption tower 4 as in the apparatus of FIG. 17, abnormalities in the driving condition can be more accurately determined than apparatuses of Embodiments 1 to 16.

Embodiment 18

Figure 18:
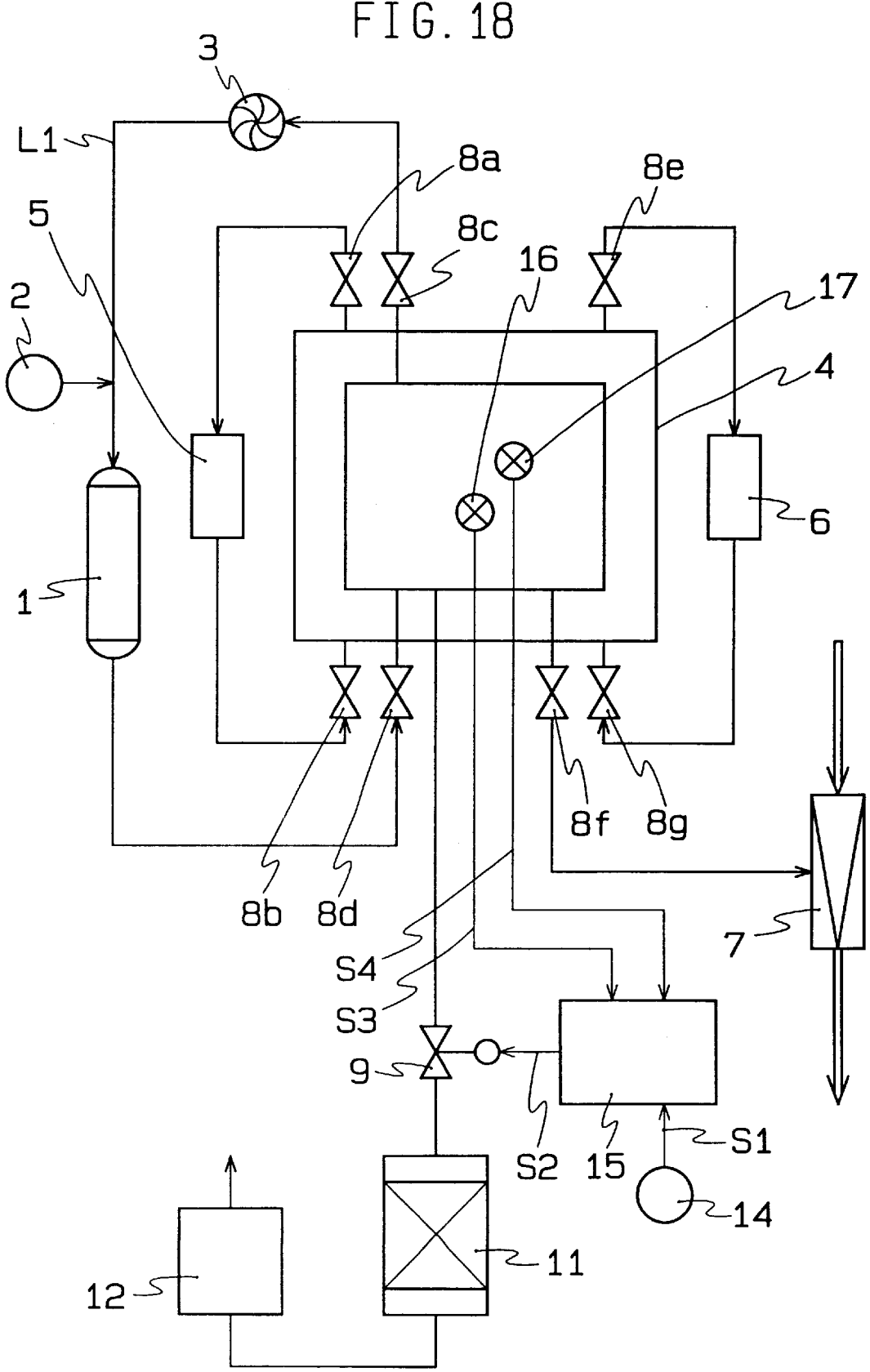
FIG. 18 is a diagram showing an arrangement of an ozone producing apparatus according to Embodiment 18 of the present invention.

FIG. 18 is a diagram showing an arrangement of an ozone producing apparatus according to Embodiment 18 of the present invention. The apparatus of this embodiment is arranged in such a manner that the reducer storage 10 of Embodiment 17 is replaced by the filler 11 and ozone decomposer 12 of Embodiment 2.

Operations of the apparatus of FIG. 18 are almost identical with those of the apparatus of FIG. 17. That is, the electricity supply condition to the apparatus, the internal pressure and temperature in the adsorption/desorption tower 4 are continuously monitored by the electricity supply condition monitor 14, pressure gauge 16, and thermometer 17, respectively. Output signals of these are transmitted to the control circuit 15 via the signal lines S1, S3 and S4, respectively. Based on the electricity supply condition, measured value of the pressure gauge 16, measured value of the thermometer 17 and the driving condition, an opening/closing or opening degree adjusting signal for the switch valve 9 is sent to the switch valve via the signal line S2 when either of these values has deviated from a predetermined suitable driving condition range, and based on this signal the opening/closing condition or opening degree is controlled at the switch valve 9.

Monitoring of electricity supply condition to the apparatus might be performed, similarly to the apparatus of FIG. 17, by utilizing a contact signal of a relay provided in the electricity supply line, and monitoring of a lapsed time after power failure might be performed by providing a timer in the control circuit 15. Further, supply of power at the time of power failure might be performed by using, for instance, a storage battery. Each of these measures can be performed easily and at low cost. The suitable pressure and temperature ranges for each of the driving processes can be preliminarily set based on experiments, pressure resistivity of the adsorption/desorption tower 4, driving pressure of the ozone generator (set pressure for the piping L1 during adsorbing and storing process), vacuum reaching pressure of the ejector 7, set temperature for the cooling source 5, set temperature for the heating source 6, or an adsorption/desorption heat quantity of ozone with respect to silica gel or the like.

The electricity supply condition to the apparatus, and pressure and temperature in the adsorption/desorption tower 4 are automatically measured, and the opening/closing condition or the opening degree of the switch valve 9 is controlled based on these measured signals and preliminarily set suitable driving condition ranges for the driving process in order to draw ozone stored in the adsorption/desorption tower 4 even in the case where electricity supply to the apparatus is terminated or where the pressure or temperature in the adsorption/desorption tower 4 is deviated from a suitable range for the driving condition and the apparatus is under an abnormal driving condition. With this arrangement, adsorbed and stored ozone can be prevented from being rapidly decomposed even under an abnormal driving condition, and safe driving can be performed. It should be noted that by simultaneously monitoring electricity supply condition to the apparatus, and pressure and temperature in the adsorption/desorption tower 4 in the apparatus of FIG. 18, similarly to the apparatus of FIG. 17, abnormalities in the driving condition can be more accurately determined than apparatuses of Embodiments 1 to 16.

Embodiment 19

Figure 19:
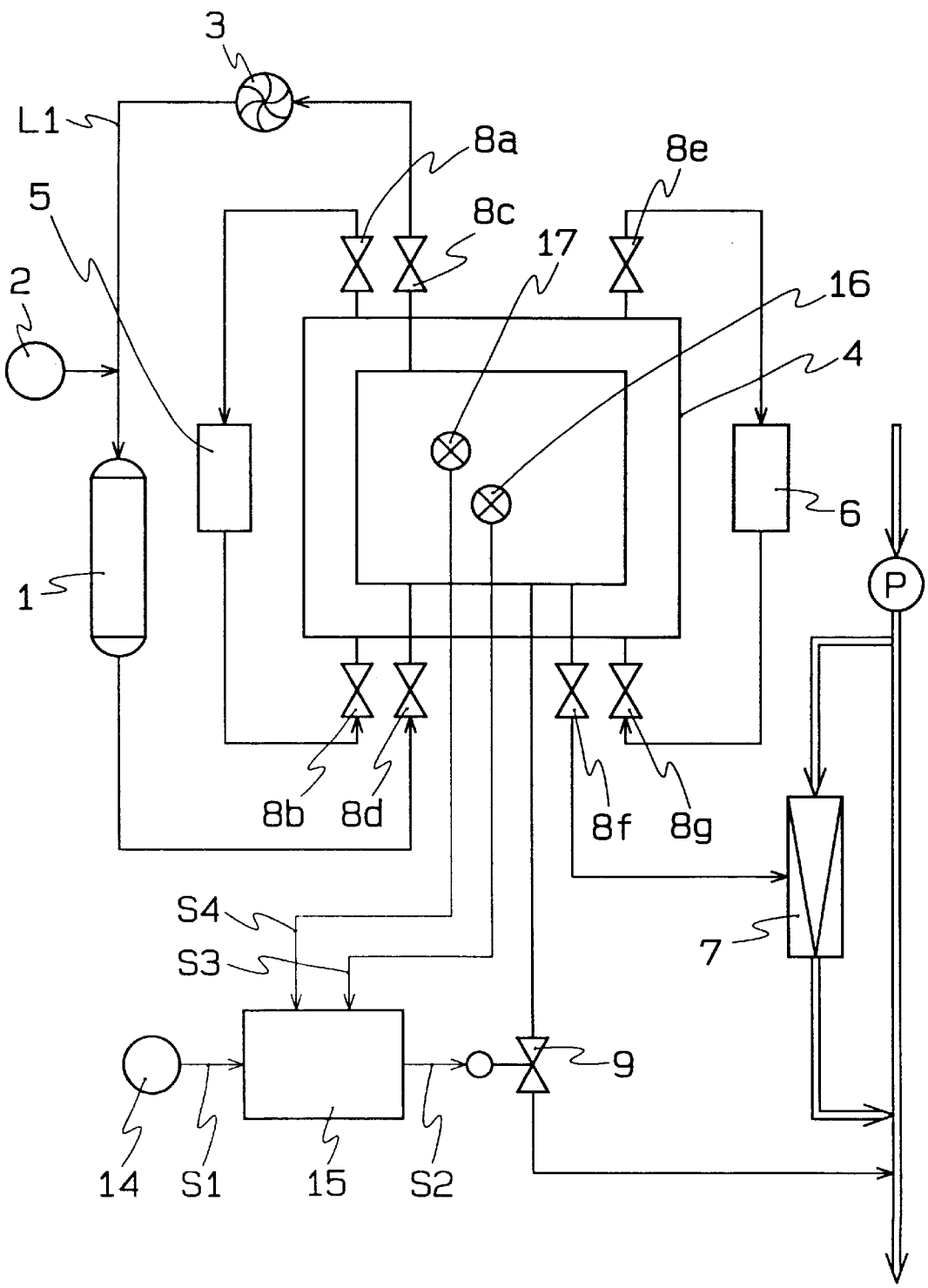
FIG. 19 is a diagram showing an arrangement of an ozone producing apparatus according to Embodiment 19 of the present invention.

FIG. 19 is a diagram showing an arrangement of an ozone producing apparatus according to Embodiment 19 of the present invention. The apparatus of this embodiment is arranged in such a manner that the pressure detecting means of Embodiment 9 and the temperature detecting means of Embodiment 13 are connected to the monitoring means of Embodiment 7.

Operations of the apparatus of FIG. 19 are almost identical with those of the apparatuses of FIGS. 17 and 18. That is, the electricity supply condition to the apparatus, the internal pressure and temperature in the adsorption/desorption tower 4 are continuously monitored by the electricity supply condition monitor 14, pressure gauge 16, and thermometer 17, respectively. Output signals of these are transmitted to the control circuit 15 via the signal lines S1, S3 and S4, respectively. Based on the electricity supply condition, measured value of the pressure gauge 16, measured value of the thermometer 17 and the driving condition, an opening/closing or opening degree adjusting signal for the switch valve 9 is sent to the switch valve via the signal line S2 when either of these values has deviated from a predetermined suitable driving condition range, and based on this signal the opening/closing condition or opening degree is controlled at the switch valve 9.

Monitoring of electricity supply condition to the apparatus might be performed, similarly to the apparatuses of FIGS. 17 and 18, by utilizing a contact signal of a relay provided in the electricity supply line, and monitoring of a lapsed time after power failure might be performed by providing a timer in the control circuit 15. Further, supply of power at the time of power failure might be performed by using, for instance, a storage battery. Each of these measures can be performed easily and at low cost. The suitable pressure and temperature ranges for each of the driving processes can be preliminarily set based on experiments, pressure resistivity of the adsorption/desorption tower 4, driving pressure of the ozone generator (set pressure for the piping L1 during adsorbing and storing process), vacuum reaching pressure of the ejector 7, set temperature for the cooling source 5, set temperature for the heating source 6, or an adsorption/desorption heat quantity of ozone with respect to silica gel or the like.

The electricity supply condition to the apparatus, and pressure and temperature in the adsorption/desorption tower 4 are automatically measured, and the opening/closing condition or the opening degree of the switch valve 9 is controlled based on these measured signals and preliminarily set suitable driving condition ranges for the driving process in order to draw ozone stored in the adsorption/desorption tower 4 even in the case where electricity supply to the apparatus is terminated or where the pressure or temperature in the adsorption/desorption tower 4 is deviated from a suitable range for the driving condition and the apparatus is under an abnormal driving condition. With this arrangement, adsorbed and stored ozone can be prevented from being rapidly decomposed even under an abnormal driving condition, and safe driving can be performed. It should be noted that by simultaneously monitoring electricity supply condition to the apparatus, and pressure and temperature in the adsorption/desorption tower 4 like in the apparatus of FIG. 19, similarly to the apparatuses of FIGS. 17 and 18, abnormalities in the driving condition can be more accurately determined than apparatuses of Embodiments 1 to 16.

Embodiment 20

Figure 20:
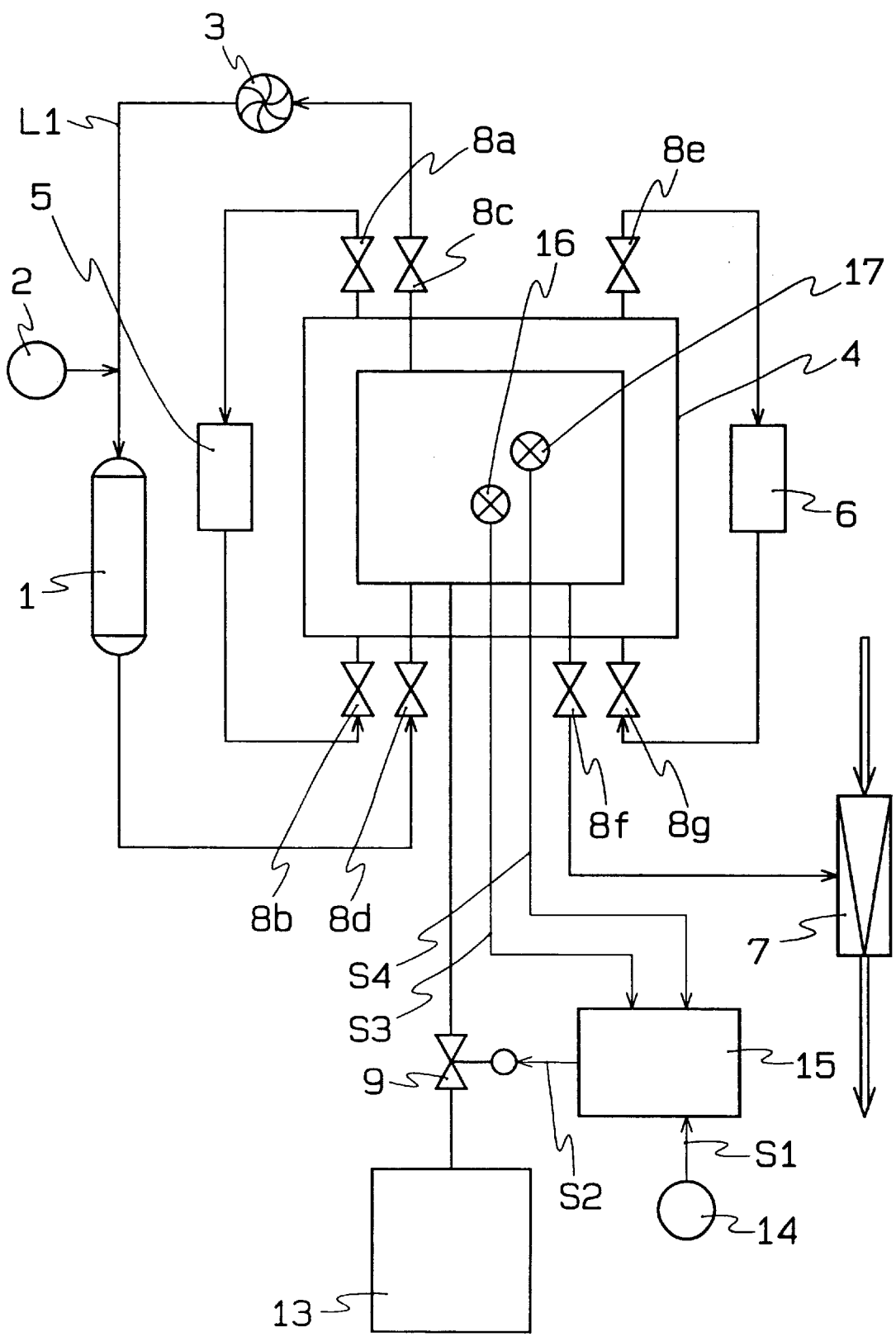
FIG. 20 is a diagram showing an arrangement of an ozone producing apparatus according to Embodiment 20 of the present invention.

FIG. 20 is a diagram showing an arrangement of an ozone producing apparatus according to Embodiment 20 of the present invention. The apparatus of this embodiment is arranged in such a manner that the pressure detecting means of Embodiment 9 and the temperature detecting means of Embodiment 13 are connected to the monitoring means of Embodiment 8.

Operations of the apparatus of FIG. 20 are almost identical with those of the apparatuses of FIGS. 17 to 19. That is, the electricity supply condition to the apparatus, the internal pressure and temperature in the adsorption/desorption tower 4 are continuously monitored by the electricity supply condition monitor 14, pressure gauge 16, and thermometer 17, respectively. Output signals of these are transmitted to the control circuit 15 via the signal lines S1, S3 and S4, respectively. Based on the electricity supply condition, measured value of the pressure gauge 16, measured value of the thermometer 17 and the driving condition, an opening/closing or opening degree adjusting signal for the switch valve 9 is sent to the switch valve via the signal line S2 when either of these values has deviated from a predetermined suitable driving condition range, and based on this signal the opening/closing condition or opening degree is controlled at the switch valve 9.

Monitoring of electricity supply condition to the apparatus might be performed, similarly to the apparatuses of Embodiments 17 to 19, by utilizing a contact signal of a relay provided in the electricity supply line, and monitoring of a lapsed time after power failure might be performed by providing a timer in the control circuit 15. Further, supply of power at the time of power failure might be performed by using, for instance, a storage battery. Each of these measures can be performed easily and at low cost. The suitable pressure and temperature ranges for each of the driving 10 processes can be preliminarily set based on experiments, pressure resistivity of the adsorption/desorption tower 4, driving pressure of the ozone generator (set pressure for the piping L1 during adsorbing and storing process), vacuum reaching pressure of the ejector 7, set temperature for the cooling source 5, set temperature for the heating source 6, or an adsorption/desorption heat quantity of ozone with respect to silica gel or the like.

The electricity supply condition to the apparatus, and pressure and temperature in the adsorption/desorption tower 4 are automatically measured, and the opening/closing condition or the opening degree of the switch valve 9 is controlled based on these measured signals and preliminarily set suitable driving condition ranges for the driving process in order to draw ozone stored in the adsorption/desorption tower 4 even in the case where electricity supply to the apparatus is terminated or where the pressure or temperature in the adsorption/desorption tower 4 is deviated from a suitable range for the driving condition and the apparatus is under an abnormal driving condition. With this arrangement, adsorbed and stored ozone can be prevented from being rapidly decomposed even under an abnormal driving condition, and safe driving can be performed.

Further, by simultaneously monitoring the electricity supply condition to the apparatus, and pressure and temperature in the adsorption/desorption tower 4 like in the apparatus of FIG. 20, similarly to the apparatuses of FIGS. 17 to 19, abnormalities in the driving condition can be more accurately determined than apparatuses of Embodiments 1 to 16.

While Embodiments 17 to 20 have been explained by taking a case in which all of the electricity supply condition to the apparatus, and pressure and temperature in the adsorption/desorption tower 4 are automatically obtained, all of these items are not necessarily required to be obtained, and the driving condition might also be monitored based on one or two items among these.

Embodiment 21

Figure 21:
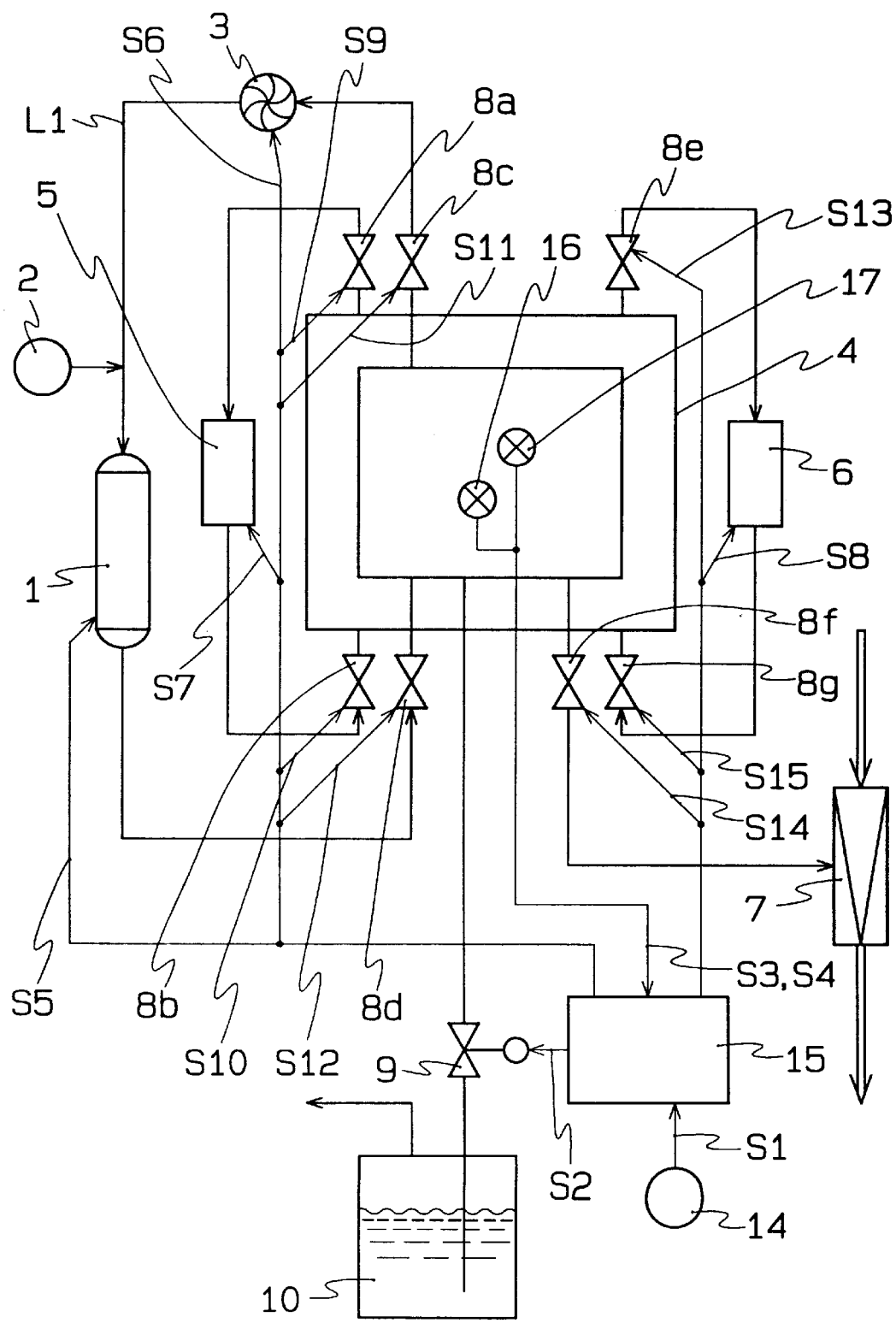
FIG. 21 is a diagram showing an arrangement of an ozone producing apparatus according to Embodiment 21 of the present invention.

FIG. 21 is a diagram showing an arrangement of an ozone producing apparatus according to Embodiment 21 of the present invention. In FIG. 21, S5 to S11 are signal lines which connect the control circuit 15 with the ozone generator 1, circulating blower 3, cooling source 5, and switch valves 8a to 8d, respectively. S12 to S15 are also signal lines which connect the control circuit 15 with the heating source 6 and switch valves 8e to 8g, respectively. The remaining arrangements are identical with those of the apparatuses of FIGS. 1, 5, 9, 13, and 17.

Operations of the apparatus of FIG. 21 will now be explained. In this apparatus, the electricity supply condition to the apparatus is continuously monitored by the electricity supply condition monitor 14, the internal pressure in the adsorption/desorption tower 4 by the pressure gauge 16, and the internal temperature in the adsorption/desorption tower 4 by the thermometer 17, and based on these output signals, the control circuit 15 determines whether the apparatus is under an abnormal driving condition. When either of these values has deviated from a predetermined suitable driving condition range, a signal is sent to the switch valve 9 via the signal line S2 and based on this signal the opening/closing condition or opening degree is controlled at the switch valve 9. The condition of the apparatus is continued to be monitored also thereafter by the electricity supply condition monitor 14, pressure gauge 16 in the adsorption/desorption tower 4 and thermometer 17 in the adsorption/desorption tower 4, and when these values have returned to the preliminarily set driving condition ranges, the switch valve 9 is closed through the signal line S2, and the ozone generator 1, circulating blower 3, cooling source 5, heating source 6, and switch valves 8a to 8g are operated by the signal lines S5 to S15 to return the apparatus to the original driving condition. The electricity supply condition to the apparatus, and the pressure and temperature in the adsorption/desorption tower 4 are thus continuously monitored also after operating the switch valve 9 to perform suitable and safe measures when electricity supply to the apparatus is terminated or the pressure or temperature in the adsorption/desorption tower 4 has deviated from a suitable range for the driving condition and the apparatus is under an abnormal driving condition. In the case where these values return to predetermined normal ranges, the original driving condition is automatically assumed. With this arrangement, the apparatus can be safely operated without completely terminating the operation to cope with short time power failure or short-term and temporal abnormalities in pressure or temperature.

Embodiment 22

Figure 22:
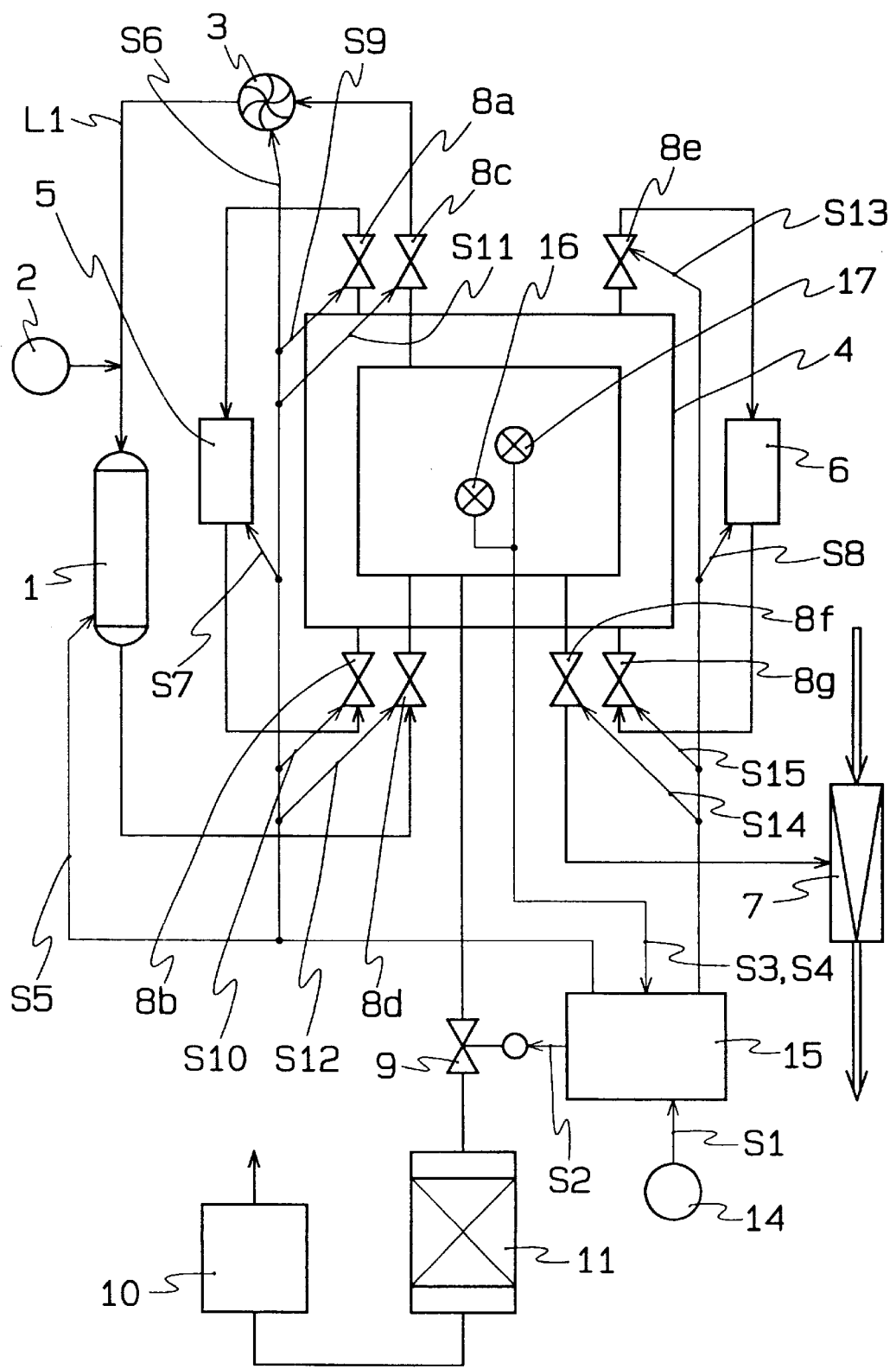
FIG. 22 is a diagram showing an arrangement of an ozone producing apparatus according to Embodiment 22 of the present invention.

FIG. 22 is a diagram showing an arrangement of an ozone producing apparatus according to Embodiment 22 of the present invention. The apparatus of this embodiment is arranged in such a manner that the reducer storage 10 of Embodiment 21 is replaced by the filler 11 and the ozone decomposer 12 of Embodiment 2.

Operations of the apparatus of FIG. 22 are almost identical with those of FIG. 21. That is, the electricity supply condition to the apparatus is continuously monitored by the electricity supply condition monitor 14, the internal pressure in the adsorption/desorption tower 4 by the pressure gauge 16, and the internal temperature in the adsorption/desorption tower 4 by the thermometer 17, and based on these output signals, the control circuit 15 determines whether the apparatus is under an abnormal driving condition. When either of these values has deviated from a predetermined suitable driving condition range, a signal is sent to the switch valve 9 via the signal line S2 and based on this signal the opening/closing condition or opening degree is controlled at the switch valve 9. The condition of the apparatus is continued to be monitored also thereafter by the electricity supply condition monitor 14, pressure gauge 16 in the adsorption/desorption tower 4 and thermometer 17 in the adsorption/desorption tower 4, and when these values have returned to the predetermined driving condition ranges, the switch valve 9 is closed through the signal line S2, and the ozone generator 1, circulating blower 3, cooling source 5, heating source 6, and switch valves 8a to 8g are operated by the signal lines S5 to S15 to return the apparatus to the original driving condition.

The electricity supply condition to the apparatus, and the pressure and temperature in the adsorption/desorption tower 4 are thus continuously monitored also after operating the switch valve 9 to perform suitable and safe measures when electricity supply to the apparatus is terminated or the pressure or temperature in the adsorption/desorption tower 4 has deviated from a suitable range for the driving condition and the apparatus is under an abnormal driving condition. In the case where these values return to predetermined normal ranges, the original driving condition is automatically assumed. With this arrangement, the apparatus can be safely operated without completely terminating the operation to cope with short time power failure or short-term and temporal abnormalities in pressure or temperature.

Embodiment 23

Figure 23:
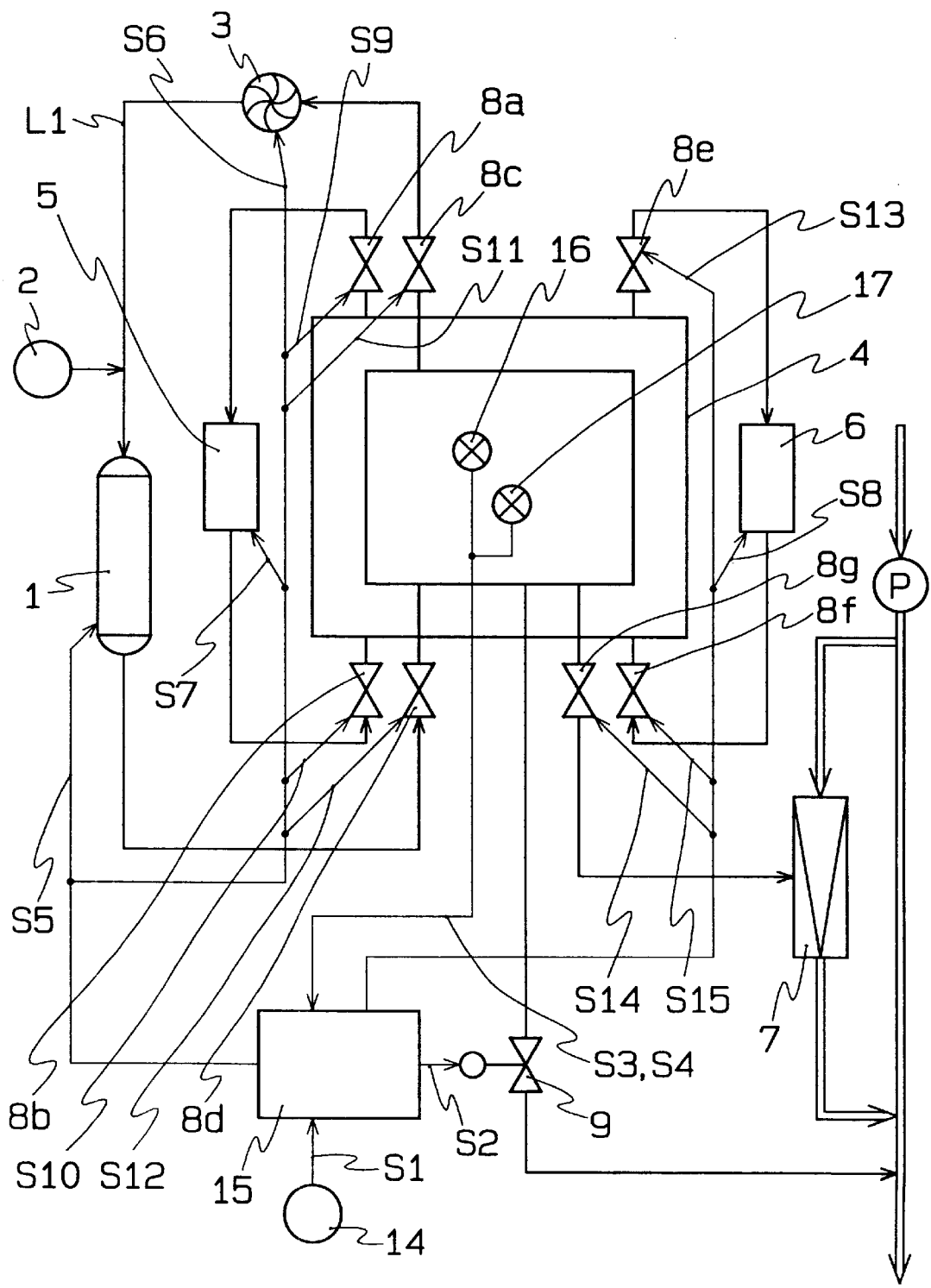
FIG. 23 is a diagram showing an arrangement of an ozone producing apparatus according to Embodiment 23 of the present invention.

FIG. 23 is a diagram showing an arrangement of an ozone producing apparatus according to Embodiment 23 of the present invention. The apparatus of this embodiment is arranged in such a manner that the control circuit 15 of Embodiment 19 is connected to the ozone generator 1, circulating blower 3, cooling source 5, heating source 6, and switch valves 8a to 8g, similarly to the previous Embodiments 21 and 22.

Operations of the apparatus of FIG. 23 are almost identical with those of the apparatuses of FIGS. 21 and 22. That is, the electricity supply condition to the apparatus is continuously monitored by the electricity supply condition monitor 14, the internal pressure in the adsorption/desorption tower 4 by the pressure gauge 16, and the internal temperature in the adsorption/desorption tower 4 by the thermometer 17, and based on these output signals, the control circuit 15 determines whether the apparatus is under an abnormal driving condition. When either of these values has deviated from a predetermined suitable driving condition range, a signal is sent to the switch valve 9 via the signal line S2 and based on this signal the opening/closing condition or opening degree is controlled at the switch valve 9.

The condition of the apparatus is continued to be monitored also thereafter by the electricity supply condition monitor 14, pressure gauge 16 in the adsorption/desorption tower 4 and thermometer 17 in the adsorption/desorption tower 4, and when these values have returned to the preliminarily set driving condition ranges, the switch valve 9 is closed through the signal line S2 and the ozone generator 1, circulating blower 3, cooling source 5, heating source 6, and switch valves 8a to 8g are operated by the signal lines S5 to S15 to return the apparatus to the original driving condition.

The electricity supply condition to the apparatus, and the pressure and temperature in the adsorption/desorption tower 4 are thus continuously monitored also after operating the switch valve 9 to perform suitable and safe measures when electricity supply to the apparatus is terminated or the pressure or temperature in the adsorption/desorption tower 4 has deviated from a suitable range for the driving condition and the apparatus is under an abnormal driving condition. In the case where these values return to predetermined normal ranges, the original driving condition is automatically assumed. With this arrangement, the apparatus can be safely operated without completely terminating the operation to cope with short time power failure or short-term and temporal abnormalities in pressure or temperature.

Embodiment 24

Figure 24:
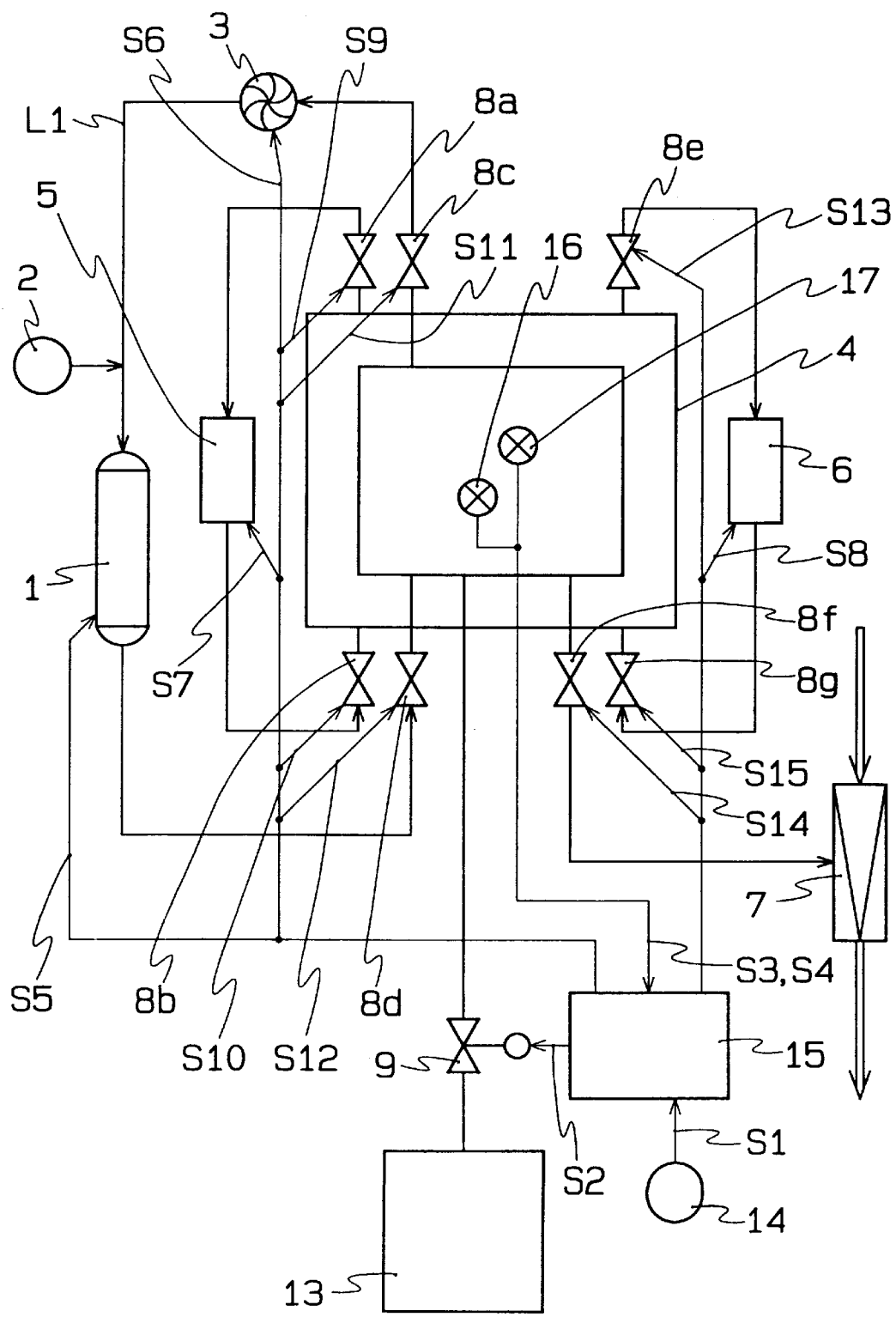
FIG. 24 is a diagram showing an arrangement of an ozone producing apparatus according to Embodiment 24 of the present invention.
Figure 25:
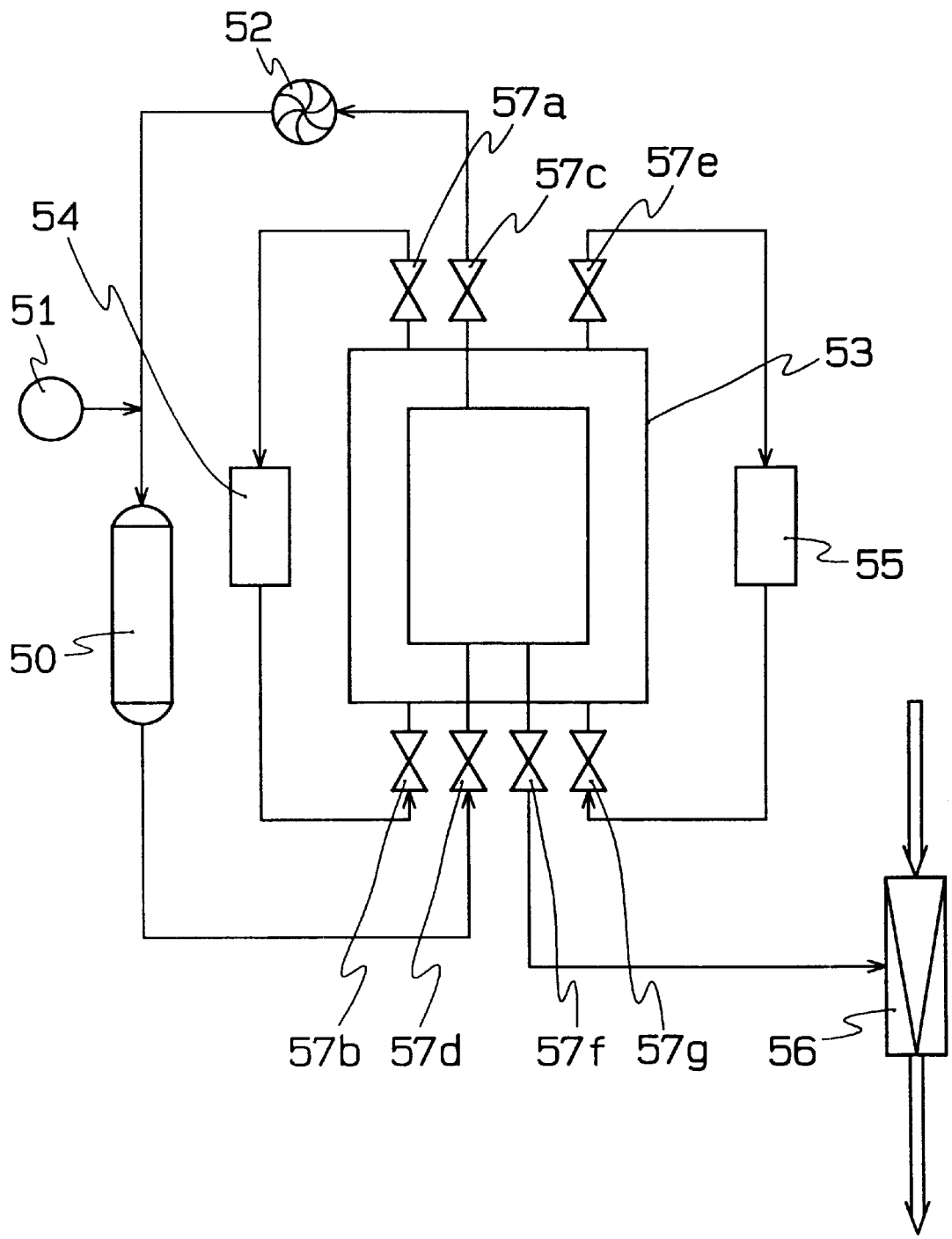
FIG. 25 is a diagram showing an arrangement of a conventional ozone producing apparatus.

FIG. 24 is a diagram showing an arrangement of an ozone producing apparatus according to Embodiment 24 of the present invention. The apparatus of this embodiment is arranged in such a manner that the control circuit 15 of Embodiment 20 is connected to the ozone generator 1, circulating blower 3, cooling source 5, heating source 6, and switch valves 8a to 8g, similarly to the previous Embodiments 21 and 22.

Operations of the apparatus of FIG. 24 are almost identical with those of the apparatuses of FIGS. 21 to 23. That is, the electricity supply condition to the apparatus is continuously monitored by the electricity supply condition monitor 14, the internal pressure in the adsorption/desorption tower 4 by the pressure gauge 16, and the internal temperature in the adsorption/desorption tower 4 by the thermometer 17, and based on these output signals, the control circuit 15 determines whether the apparatus is under an abnormal driving condition. When either of these values has deviated from a predetermined suitable driving condition range, a signal is sent to the switch valve 9 via the signal line S2 and based on this signal the opening/closing condition or opening degree is controlled at the switch valve 9. The condition of the apparatus is continued to be monitored also thereafter by the electricity supply condition monitor 14, pressure gauge 16 in the adsorption/desorption tower 4 and thermometer 17 in the adsorption/desorption tower 4, and when these values have returned to the preliminarily set driving condition ranges, the switch valve 9 is closed through the signal line S2 and the ozone generator 1, circulating blower 3, cooling source 5, heating source 6, and switch valves 8a to 8g are operated by the signal lines S5 to S15 to return the apparatus to the original driving condition.

The electricity supply condition to the apparatus, and the pressure and temperature in the adsorption/desorption tower 4 are thus continuously monitored also after operating the switch valve 9 to perform suitable and safe measures when electricity supply to the apparatus is terminated or the pressure or temperature in the adsorption/desorption tower 4 has deviated from a suitable range for the driving condition and the apparatus is under an abnormal driving condition. In the case where these values return to predetermined normal ranges, the original driving condition is automatically assumed. With this arrangement, the apparatus can be safely operated without completely terminating the operation to cope with short time power failure or short-term and temporal abnormalities in pressure or temperature.

According to the ozone producing apparatus of the first invention, desorbed ozone of high density is introduced to the reducer storage for making the reducer react with ozone; according to the ozone producing apparatus of the second invention, desorbed ozone of high density is introduced to the filler for equalizing the ozone density and decomposing ozone with the ozone decomposer; according to the ozone producing apparatus of the third invention, a piping for supplying ozone directly to places where ozone is used is provided to introduce desorbed ozone of high density; and according to the ozone producing apparatus of the fourth invention, desorbed ozone of high density is introduced to the gas storage for equalizing the ozone density and decomposing ozone with the ozone decomposer. With these arrangements, desorbed ozone can be safely treated even in case of power failure or an abnormal driving condition in which high pressure and high temperature exist in the adsorption/desorption tower.

In case of power failure or an abnormal driving condition of the apparatus according to the fifth invention which includes a means for automatically detecting power failure; in the case where the pressure of the adsorption/desorption tower is deviated from a suitable range for driving to be abnormal driving condition in the apparatus according to the sixth invention which includes a means for automatically measuring the pressure in the adsorption/desorption tower; and in the case where the temperature of the adsorption/desorption tower is deviated from a suitable range for driving to be abnormal driving condition in the apparatus according to the seventh invention which includes a means for automatically measuring the temperature in the adsorption/desorption tower, ozone which has been stored in the adsorption/desorption tower is drawn for treatment based on these detecting signals or measuring signals, and safe driving can be performed also when the apparatus is under an abnormal driving condition.

Further, according to the apparatus of the eighth invention, ozone which has been stored in the adsorption/desorption tower is drawn and is suitably and safely treated also under an abnormal driving condition, and simultaneously, the electricity supply condition, and pressure and temperature in the adsorption/desorption tower are monitored, and when these values return to predetermined normal ranges, the original driving condition is automatically assumed. With this arrangement, the apparatus can be safely operated without completely terminating the operation to cope with short time power failure or short-term and temporal abnormalities in pressure or temperature.

What is claimed is:

1. An ozone producing apparatus comprising an ozone generator for generating ozonized oxygen, an adsorption/desorption tower for adsorbing and storing ozone from the ozonized oxygen generated by the ozone generator, and an ozone desorbing means for desorbing the adsorbed and stored ozone for supply, wherein a reducer storage tank means for storing reducing solution therein is connected to the adsorption/desorption tower through a switch valve which is opened when the ozone producing apparatus is under an abnormal driving condition.

2. An ozone producing apparatus comprising an ozone generator for generating ozonized oxygen, an adsorption/desorption tower for adsorbing and storing ozone from the ozonized oxygen generated by the ozone generator, and an ozone desorbing means for desorbing the adsorbed and stored ozone for supply, wherein a filler which is filled with ozone adsorbent and which is connected with an ozone decomposer is connected to the adsorption/desorption tower through a switch valve which is opened when the ozone producing apparatus is under an abnormal driving condition.

3. An ozone producing apparatus comprising an ozone generator for generating ozonized oxygen, an adsorption/desorption tower for adsorbing and storing ozone from the ozonized oxygen generated by the ozone generator, and an ozone desorbing means for desorbing the adsorbed and stored ozone for supply, wherein a pipe is disposed between the adsorption/desorption tower and a water piping in order that the adsorbed and stored ozone is injected into the water piping through a switch valve means for opening the valve when the ozone producing apparatus is under an abnormal driving condition.

4. The apparatus of claim 1, wherein the apparatus includes a pressure detecting means for measuring a pressure in the adsorption/desorption tower which determines that the apparatus is under an abnormal driving condition when the pressure in the adsorption/desorption tower has deviated from a predetermined range.

5. The apparatus of claim 1, wherein the apparatus includes a temperature detecting means for measuring a temperature in the adsorption/desorption tower which determines that the apparatus is under an abnormal driving condition when the temperature in the adsorption/desorption tower has deviated from a predetermined range.

6. The apparatus of claim 1, wherein the apparatus automatically returns to the original driving condition when it has restored from an abnormal driving condition to a normal condition.

7. The apparatus of claim 2, wherein the apparatus includes an electricity supply monitor for detecting a power failure condition which determines that the apparatus is under an abnormal driving condition when a power failure is detected.

8. The apparatus of claim 2, wherein the apparatus includes a pressure detecting means for measuring a pressure in the adsorption/desorption tower which determines that the apparatus is under an abnormal driving condition when the pressure in the adsorption/desorption tower has deviated from a predetermined range.

9. The apparatus of claim 2, wherein the apparatus includes a temperature detecting means for measuring a temperature in the adsorption/desorption tower which determines that the apparatus is under an abnormal driving condition when the temperature in the adsorption/desorption tower has deviated from a predetermined range.

10. The apparatus of claim 2, wherein the apparatus automatically returns to the original driving condition when it has restored from an abnormal driving condition to a normal condition.

11. The apparatus of claim 3, wherein the apparatus includes an electricity supply monitor for detecting a power failure condition which determines that the apparatus is under an abnormal driving condition when a power failure is detected.

12. The apparatus of claim 3, wherein the apparatus includes a pressure detecting means for measuring a pressure in the adsorption/desorption tower which determines that the apparatus is under an abnormal driving condition when the pressure in the adsorption/desorption tower has deviated from a predetermined range.

13. The apparatus of claim 3, wherein the apparatus includes a temperature detecting means for measuring a temperature in the adsorption/desorption tower which determines that the apparatus is under an abnormal driving condition when the temperature in the adsorption/desorption tower has deviated from a predetermined range.

14. The apparatus of claim 3, wherein the apparatus automatically returns to the original driving condition when it has restored from an abnormal driving condition to a normal condition.

15. The apparatus of claim 1, wherein the apparatus includes a power supply monitor for detecting a power failure condition which determines that the apparatus is under an abnormal driving condition when a power failure is detected.

* * * * *